United States Patent
Park et al.

(10) Patent No.: US 10,956,260 B2
(45) Date of Patent: Mar. 23, 2021

(54) SEMICONDUCTOR MEMORY DEVICES, AND METHODS OF OPERATING SEMICONDUCTOR MEMORY DEVICES

(71) Applicant: Samsung Electronics Co., Ltd., Suwon-si (KR)

(72) Inventors: Jaekoo Park, Hwaseong-si (KR); Younghun Seo, Hwaseong-si (KR)

(73) Assignee: Samsung Electronics Co., Ltd.

( * ) Notice: Subject to any disclaimer, the term of this patent is extended or adjusted under 35 U.S.C. 154(b) by 2 days.

(21) Appl. No.: 16/682,685

(22) Filed: Nov. 13, 2019

(65) Prior Publication Data
US 2020/0371869 A1   Nov. 26, 2020

(30) Foreign Application Priority Data
May 22, 2019   (KR) .................. 10-2019-0059967

(51) Int. Cl.
*G06F 11/10*   (2006.01)
*G06F 12/121*  (2016.01)

(52) U.S. Cl.
CPC ...... *G06F 11/1048* (2013.01); *G06F 11/1016* (2013.01); *G06F 11/1076* (2013.01); *G06F 12/121* (2013.01)

(58) Field of Classification Search
CPC ............. G06F 11/1048; G06F 11/1016; G06F 11/1076; G06F 12/121
See application file for complete search history.

(56) References Cited

U.S. PATENT DOCUMENTS

| | | | |
|---|---|---|---|
| 6,493,772 B1* | 12/2002 | Hughes | G06F 11/0727 710/15 |
| 6,978,342 B1* | 12/2005 | Estakhri | G06F 3/0613 711/103 |
| 7,916,558 B2 | 3/2011 | Do | |
| 8,959,417 B2 | 2/2015 | Zhu et al. | |
| 9,508,409 B2 | 11/2016 | Hadrick et al. | |
| 9,588,840 B2 | 3/2017 | Chung et al. | |
| 2005/0081085 A1* | 4/2005 | Ellis | G06F 11/1044 714/6.2 |
| 2006/0136800 A1 | 6/2006 | Kawabata et al. | |
| 2012/0063231 A1* | 3/2012 | Wood | G11C 11/5628 365/185.18 |
| 2014/0006727 A1* | 1/2014 | Abe | G06F 3/0653 711/154 |
| 2017/0060452 A1* | 3/2017 | Jeong | G06F 1/32 |
| 2017/0092366 A1* | 3/2017 | Hwang | G11C 11/5628 |
| 2017/0178697 A1 | 6/2017 | Wu et al. | |

(Continued)

*Primary Examiner* — Kyle Vallecillo
(74) *Attorney, Agent, or Firm* — Myers Bigel, P.A.

(57) ABSTRACT

A semiconductor memory device includes a memory cell array, an error correction code (ECC) engine, an input/output (I/O) gating circuit, and a control logic circuit. The memory cell array includes a data region and a parity region. The I/O gating circuit is connected to the ECC engine and the memory cell array. The control logic circuit generates control signals by decoding a command received from a memory controller. The ECC engine is configured to a first parity data based on a first write data associated with a first command. The control logic circuit is further configured to adjust a first write timing to write the first parity data in the parity region based on a receiving timing of a second command successive to the first command and a reference time interval.

20 Claims, 17 Drawing Sheets

(56) References Cited

U.S. PATENT DOCUMENTS

| | | | |
|---|---|---|---|
| 2017/0263316 A1* | 9/2017 | Shimizu | G11C 13/0028 |
| 2018/0039532 A1 | 2/2018 | Kim et al. | |
| 2018/0060194 A1* | 3/2018 | Ryu | G06F 3/0679 |
| 2018/0182446 A1 | 6/2018 | Kondo | |
| 2018/0341432 A1* | 11/2018 | Ware | G11C 7/1009 |
| 2019/0138225 A1* | 5/2019 | Lee | G06F 1/3225 |
| 2019/0317680 A1* | 10/2019 | Elhamias | G06F 3/0679 |
| 2020/0192605 A1* | 6/2020 | Kim | G06F 3/0613 |
| 2020/0293228 A1* | 9/2020 | Amaki | G06F 3/0604 |
| 2020/0301602 A1* | 9/2020 | Kurosawa | G06F 3/0679 |

\* cited by examiner

FIG. 8
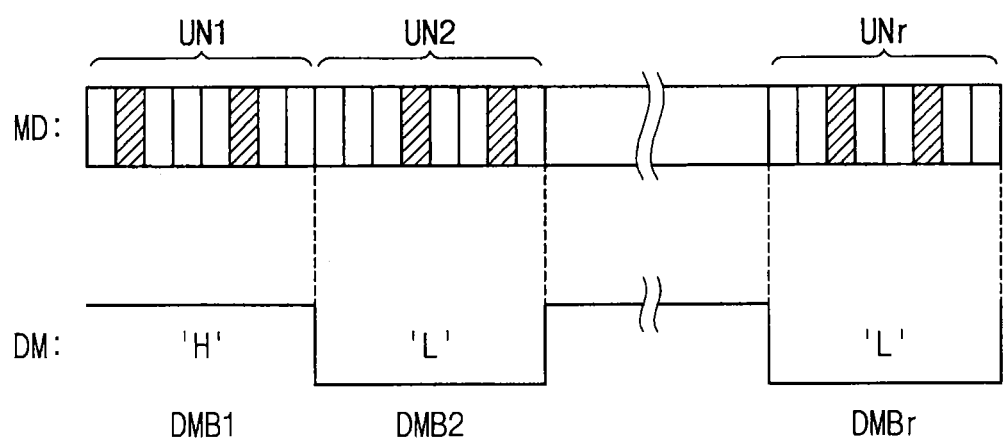
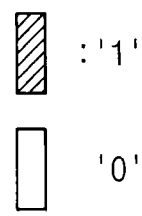

FIG. 9
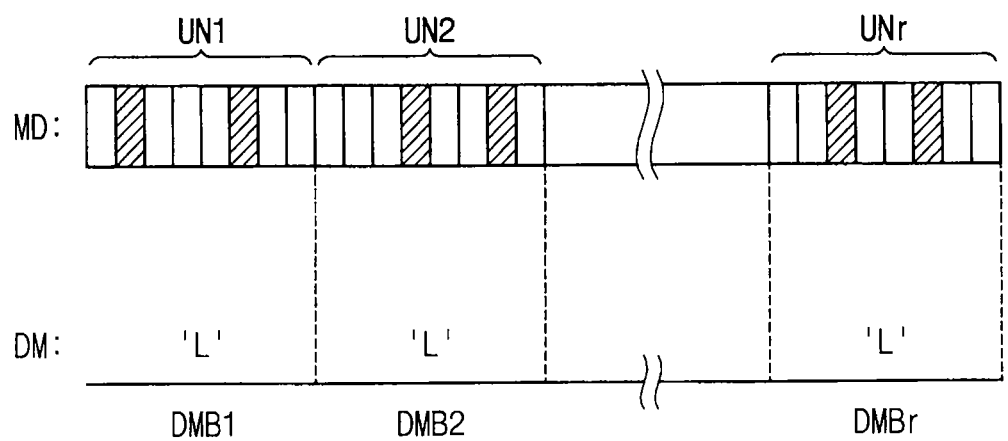
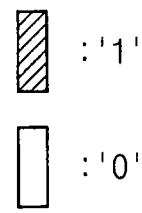
FIG. 10
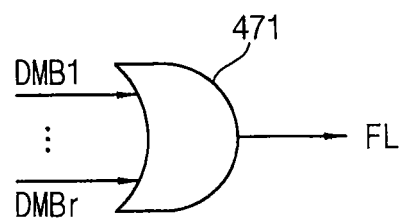

SEMICONDUCTOR MEMORY DEVICES, AND METHODS OF OPERATING SEMICONDUCTOR MEMORY DEVICES

CROSS-REFERENCE TO RELATED APPLICATION

This application claims priority from Korean Patent Application No. 10-2019-0059967, filed on May 22, 2019, in the Korean Intellectual Property Office, the disclosure of which is incorporated herein in its entirety by reference.

BACKGROUND

1. Field

Apparatuses and methods consistent with example embodiments of the inventive concepts relate to memories, and more particularly to semiconductor memory devices and methods of operating semiconductor memory devices.

2. Description of the Related Art

Semiconductor memory devices may be classified as non-volatile memory devices such as, for example, flash memory devices or volatile memory devices such as, for example, dynamic random access memories (DRAMs). High speed operation and cost efficiency of DRAMs make it possible for DRAMs to be used for system memories. In order to achieve higher yields from its fabrication process, the manufacturing process associated with semiconductor memory devices has continued to be scaled down in size, and consequently bit errors of memory cells in the DRAMs have steadily increased. Therefore, there is a need for improving the integrity of the semiconductor memory device.

SUMMARY

According to example embodiments of the inventive concepts, a semiconductor memory device includes a memory cell array, an error correction code (ECC) engine, an input/output (I/O) gating circuit, and a control logic circuit. The memory cell array includes a data region and a parity region. The I/O gating circuit is connected to the ECC engine and the memory cell array. The control logic circuit is configured to generate control signals by decoding a command received from a memory controller. The ECC engine is configured to generate a first parity data based on a first write data associated with a first command. The control logic circuit is further configured to adjust a first write timing to write the first parity data in the parity region based on a receiving timing of a second command successive to the first command and a reference time interval.

According to example embodiments of the inventive concepts, a semiconductor memory device includes a memory cell array, an error correction code (ECC) engine, an input/output (I/O) gating circuit, a control logic circuit, an address first-in first-out (FIFO) buffer, and a parity FIFO buffer. The memory cell array includes a data region and a parity region. The I/O gating circuit is connected to the ECC engine and the memory cell array. The control logic circuit is configured to generate control signals by decoding a command received from a memory controller. The address FIFO buffer is configured to store a column address for accessing the parity region. The parity FIFO buffer is configured to store a first parity data. The ECC engine is configured to generate the first parity data based on a first write data associated with a first command. The control logic circuit is further configured to control the I/O gating circuit, the address FIFO buffer, and the parity FIFO buffer such that the first write data is written in the data region at a first time and the first parity data is written in the parity region at a second time that is subsequent to the first time, based on a same column address.

According example embodiments of the inventive concepts, there is provided a method of operating a semiconductor memory device including a memory cell array including a data region and a parity region, an error correction code (ECC) engine, and a control logic circuit to control the ECC engine. In the method, a first command and a first address are received by the control logic circuit from a memory controller. A write data associated with the first command is written in a target page in the data region by the ECC engine while generating a first parity data based on the write data, and a first write timing to write the first parity data in the parity region is adjusted by the control logic circuit based on a receiving timing of a second command from the memory controller.

According example embodiments of the inventive concepts, there is provided a semiconductor memory device including a memory cell array including a data region and a parity region, an error correction code (ECC) engine configured to write a write data associated with a first command in a target page in the data region and generate a first parity data based on the write data, and a control logic circuit configured to receive the first command from a memory controller and write the first parity data in the parity region in response to a receiving timing of a second command from the memory controller.

Accordingly, the semiconductor memory device may adjust a write timing of the parity data based on receiving timings of the first command and the second command. In addition, the semiconductor memory device may include generation of the parity data in a background operation of the semiconductor memory device such that writing of the write data is not affected by the generation of the parity data. Therefore, the semiconductor memory device may separate writing timings of the write data and the write parity data and may enhance performance.

BRIEF DESCRIPTION OF THE DRAWINGS

Illustrative, non-limiting example embodiments of the inventive concepts will be more clearly understood from the following detailed description in conjunction with the accompanying drawings.

FIGS. 8 and 9 illustrate the main data and the data mask signal according to example embodiments of the inventive concepts.

FIG. 10 illustrates an example of the flag generator in FIG. 6 according to example embodiments of the inventive concepts.

DETAILED DESCRIPTION

Various example embodiments of the inventive concepts will be described more fully hereinafter with reference to the accompanying drawings, in which example embodiments are shown. Like numbers refer to like elements throughout. Thus, the same or similar numbers may be described with reference to other drawings even if they are neither mentioned nor described in the corresponding drawing. Also, elements that are not denoted by reference numbers may be described with reference to other drawings.

Figure 1:
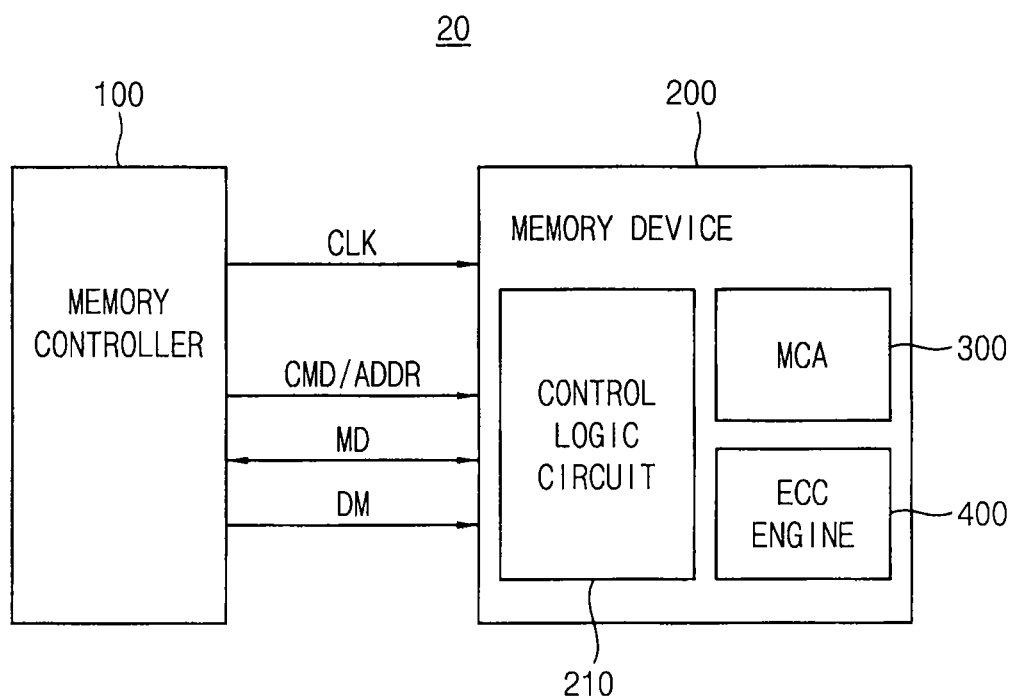
FIG. 1 is a block diagram illustrating a memory system according to some example embodiments of the inventive concepts.

FIG. 1 is a block diagram illustrating a memory system according to some example embodiments of the inventive concepts.

Referring to FIG. 1, a memory system 20 may include a memory controller 100 (e.g., an external memory controller) and at least one semiconductor memory device 200.

The memory controller 100 may control the overall operation of the memory system 20. In some embodiments, the memory controller 100 may control the overall data exchange between an external host and the semiconductor memory device 200. For example, the memory controller 100 may write data in the semiconductor memory device 200 and/or read data from the semiconductor memory device 200 in response to request from the host. As used herein, the term "and/or" includes any and all combinations of one or more of the associated listed items.

In addition, the memory controller 100 may issue operation commands to the semiconductor memory device 200 for controlling the semiconductor memory device 200.

In some example embodiments, the semiconductor memory device 200 may be a memory device including a plurality of dynamic memory cells such as, for example, a dynamic random access memory (DRAM), double data rate 4 (DDR4) synchronous DRAM (SDRAM), or a low power DDR4 (LPDDR4) SDRAM, though the inventive concepts are not limited thereto.

The memory controller 100 may transmit a clock signal CLK, a command CMD, an address (signal) ADDR and a data mask signal DM to the semiconductor memory device 200 and may exchange main data MD with the semiconductor memory device 200. The data mask signal DM may indicate whether the main data MD is masked. That is, the data mask signal DM may indicate whether a size of the main data MD is smaller than a size of a codeword of the semiconductor memory device 200.

The semiconductor memory device 200 may include a memory cell array 300 that stores the main data MD, an error correction code (ECC) engine 400, and/or a control logic circuit 210.

The ECC engine 400, in a masked write operation, may perform a read-modify operation by receiving a data and a parity data from a sub-page of a target page in the memory cell array 300 as a read data and a read parity data, correcting at least one error bit in the read data based on the read parity data to generate a corrected data and generating first parity data based on the corrected data and first write data. It will be understood that, although the terms first, second, third, etc. may be used herein to describe various elements, and elements should not be limited by these terms; rather, these terms are only used to distinguish one element from another element. Thus, a first element discussed could be termed a second element without departing from the scope of the present inventive concepts.

The control logic circuit 210 may control the ECC engine 400 such that the ECC engine 400 performs the read-modify operation without regard to (e.g., independently of) a write operation of the main data MD. The control logic circuit 210 may control the ECC engine to perform the read-modify operation by including the read-modify operation in a background operation of the semiconductor memory device 200.

Figure 2:
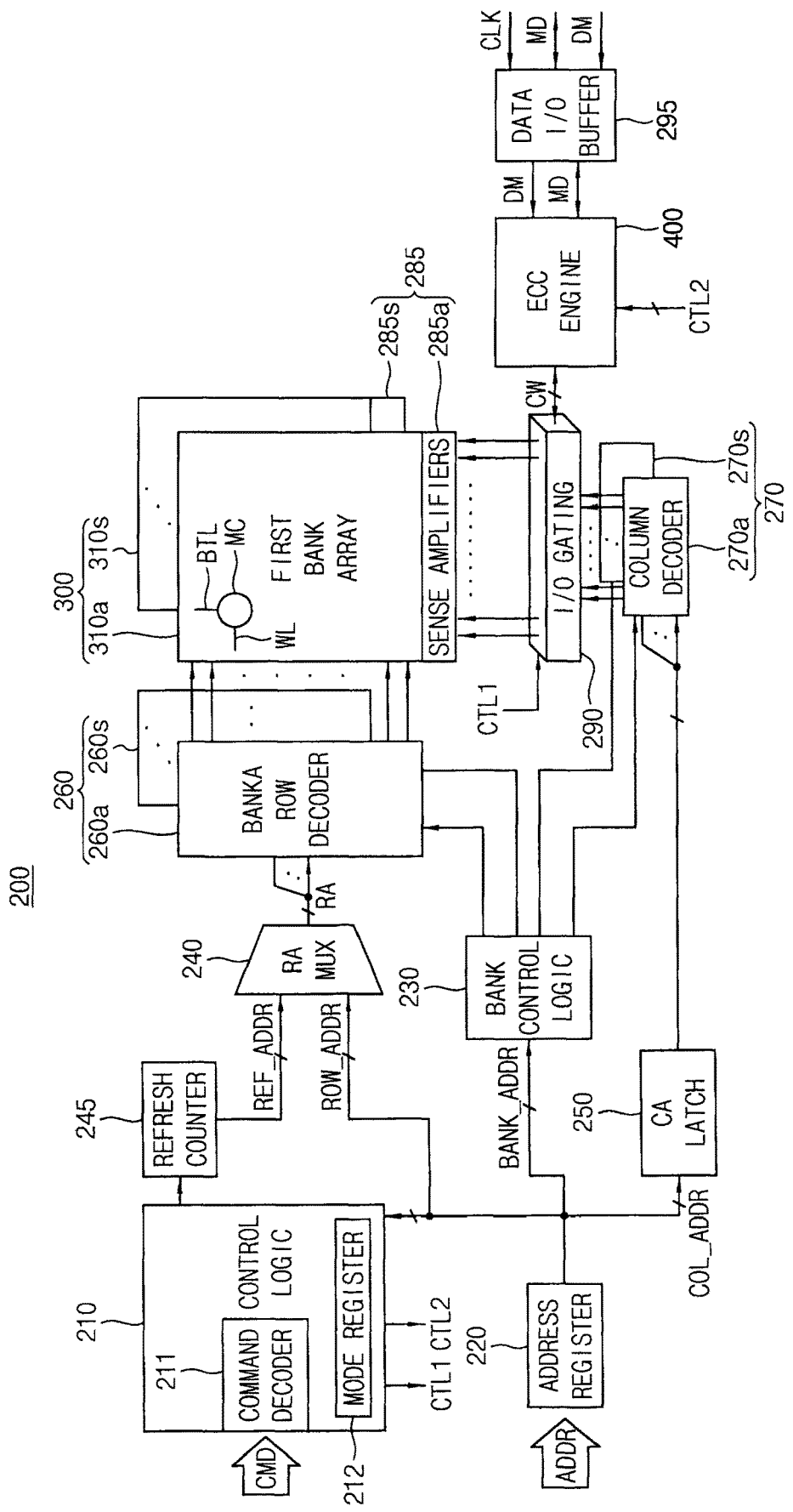
FIG. 2 is a block diagram illustrating the semiconductor memory device in FIG. 1 according to example embodiments of the inventive concepts.

FIG. 2 is a block diagram illustrating the semiconductor memory device in FIG. 1 according to example embodiments of the inventive concepts.

Referring to FIG. 2, the semiconductor memory device 200 may include a control logic circuit 210, an address register 220, a bank control logic 230, a refresh counter 245, a row address multiplexer 240, a column address latch 250, a row decoder 260, a column decoder 270, the memory cell array 300, a sense amplifier unit 285, an input/output (I/O) gating circuit 290, the ECC engine 400, and a data I/O buffer 295.

The memory cell array 300 may include first through s_th bank arrays 310a-310s. Here, s is an integer greater than one. For example, s may be sixteen, when the semiconductor memory device 200 is DDR4 SDRAM and s may be eight when the semiconductor memory device 200 is LPDDR4 SDRAM. However, the inventive concepts herein are not limited thereto. Hereinafter, for purposes of discussion, it is assumed that the semiconductor memory device 200 is DDR4 SDRAM and s is sixteen. However, it will be understood that the example of s as sixteen is not intended to limit the embodiments of the inventive concepts.

The row decoder 260 may include first through s_th (e.g., sixteen) bank row decoders 260a-260s respectively coupled to the first through s_th (e.g., sixteen) bank arrays 310a-310s, the column decoder 270 may include first through s_th (e.g., sixteen) bank column decoders 270a-270s respectively coupled to the first through sixteenth bank arrays 310a-310s, and the sense amplifier unit 285 may include first through s_th (e.g., sixteen) bank sense amplifiers 285a-285s respectively coupled to the first through sixteenth bank arrays 310a-310s. The first through sixteenth bank arrays 310a-310s, the first through sixteenth bank row decoders 260a-260s, the first through sixteenth bank column decoders 270a-270s and first through sixteenth bank sense amplifiers 285a-285s may form first through sixteenth banks. Each of the first through sixteenth bank arrays 310a-310s may include a plurality of memory cells MC formed at intersections of a plurality of word-lines WL and a plurality of bit-line BTL.

The address register 220 may receive the address ADDR including a bank address BANK_ADDR, a row address ROW_ADDR and a column address COL_ADDR from the memory controller 100. The address register 220 may provide the received bank address BANK_ADDR to the bank control logic 230, may provide the received row address ROW_ADDR to the row address multiplexer 240, and may provide the received column address COL_ADDR to the column address latch 250.

The bank control logic 230 may generate bank control signals in response to the bank address BANK_ADDR. One of the first through sixteenth bank row decoders 260a-260s corresponding to the bank address BANK_ADDR may be activated in response to the bank control signals, and one of the first through sixteenth bank column decoders 270a-270s corresponding to the bank address BANK_ADDR may be activated in response to the bank control signals.

The row address multiplexer 240 may receive the row address ROW_ADDR from the address register 220, and may receive a refresh row address REF_ADDR from the refresh counter 245. The row address multiplexer 240 may selectively output the row address ROW_ADDR or the refresh row address REF_ADDR as a row address RA. The row address RA that is output from the row address multiplexer 240 may be applied to the first through sixteenth bank row decoders 260a-260s.

The activated one of the first through sixteenth bank row decoders 260a-260s (i.e., activated by the bank control logic 230) may decode the row address RA that is output from the row address multiplexer 240, and may activate a word-line corresponding to the row address RA. For example, the activated bank row decoder may apply a word-line driving voltage to the word-line corresponding to the row address RA.

The column address latch 250 may receive the column address COL_ADDR from the address register 220, and may temporarily store the received column address COL_ADDR. In some example embodiments, in a burst mode, the column address latch 250 may generate column addresses that increment from the received column address COL_ADDR. The column address latch 250 may apply the temporarily stored or generated column address to the first through sixteenth bank column decoders 270a-270s.

The activated one of the first through sixteenth bank column decoders 270a-270s may activate a sense amplifier corresponding to the bank address BANK_ADDR and/or the column address COL_ADDR through the I/O gating circuit 290. The I/O gating circuit 290 may include circuitry for gating input/output data, and may further include read data latches for storing data that is output from the first through sixteenth bank arrays 310a-310s, and write drivers for writing data to the first through sixteenth bank arrays 310a-310s.

Codeword CW read from one bank array of the first through sixteenth bank arrays 310a-310s may be sensed by a sense amplifier coupled to the one bank array from which the data is to be read, and may be stored in the read data latches. The codeword CW stored in the read data latches may be provided to the memory controller 100 via the data I/O buffer 295 after ECC decoding is performed on the codeword CW by the ECC engine 400. The main data MD to be written in one bank array of the first through sixteenth bank arrays 310a-310s may be provided to the data I/O buffer 295 from the memory controller 100, may be provided to the ECC engine 400, parity data may be generated based on the main data MD, and the main data MD and the parity data may be written in one bank array by the write drivers.

The data I/O buffer 295 may provide the main data MD from the memory controller 100 to the ECC engine 400 in a write operation of the semiconductor memory device 200, based on the clock signal CLK, and/or may provide the main data MD from the ECC engine 400 to the memory controller 100 in a read operation of the semiconductor memory device 200. The data I/O buffer 295 may also provide the data mask signal DM indicating a masked write operation to the ECC engine 400.

The ECC engine 400, in the masked write operation, may perform a read-modify operation by receiving the data and the parity data from a sub-page of a target page in the memory cell array 300 as a read data and a read parity data, correcting at least one error bit in the read data based on the read parity data to generate a corrected data, and generating the first parity data based on the corrected data and the first write data. In addition, the ECC engine 400 may generate the first parity data based on the main data MD in a normal write operation.

In addition, the ECC engine 400, in a read operation, may receive a codeword CW read from one bank array from the I/O gating circuit 290. The ECC engine 400 may perform an ECC decoding on the main data MD based on the parity data to correct at least one error bit in the main data and may provide the corrected data to the data I/O buffer 295.

The control logic circuit 210 may control operations of the semiconductor memory device 200. For example, the control logic circuit 210 may generate control signals for the semiconductor memory device 200 in order to perform a write operation and/or a read operation. The control logic circuit 210 may include a command decoder 211 that decodes the command CMD received from the memory controller 100 and a mode register 212 that sets an operation mode of the semiconductor memory device 200.

For example, the command decoder 211 may generate the control signals corresponding to the command CMD by decoding a write enable signal, a row address strobe signal, a column address strobe signal, a chip select signal, etc. The control logic circuit 210 may generate a first control signal CTL1 to control the I/O gating circuit 290 and/or a second control signal CTL2 to control ECC engine 400.

Figure 3:
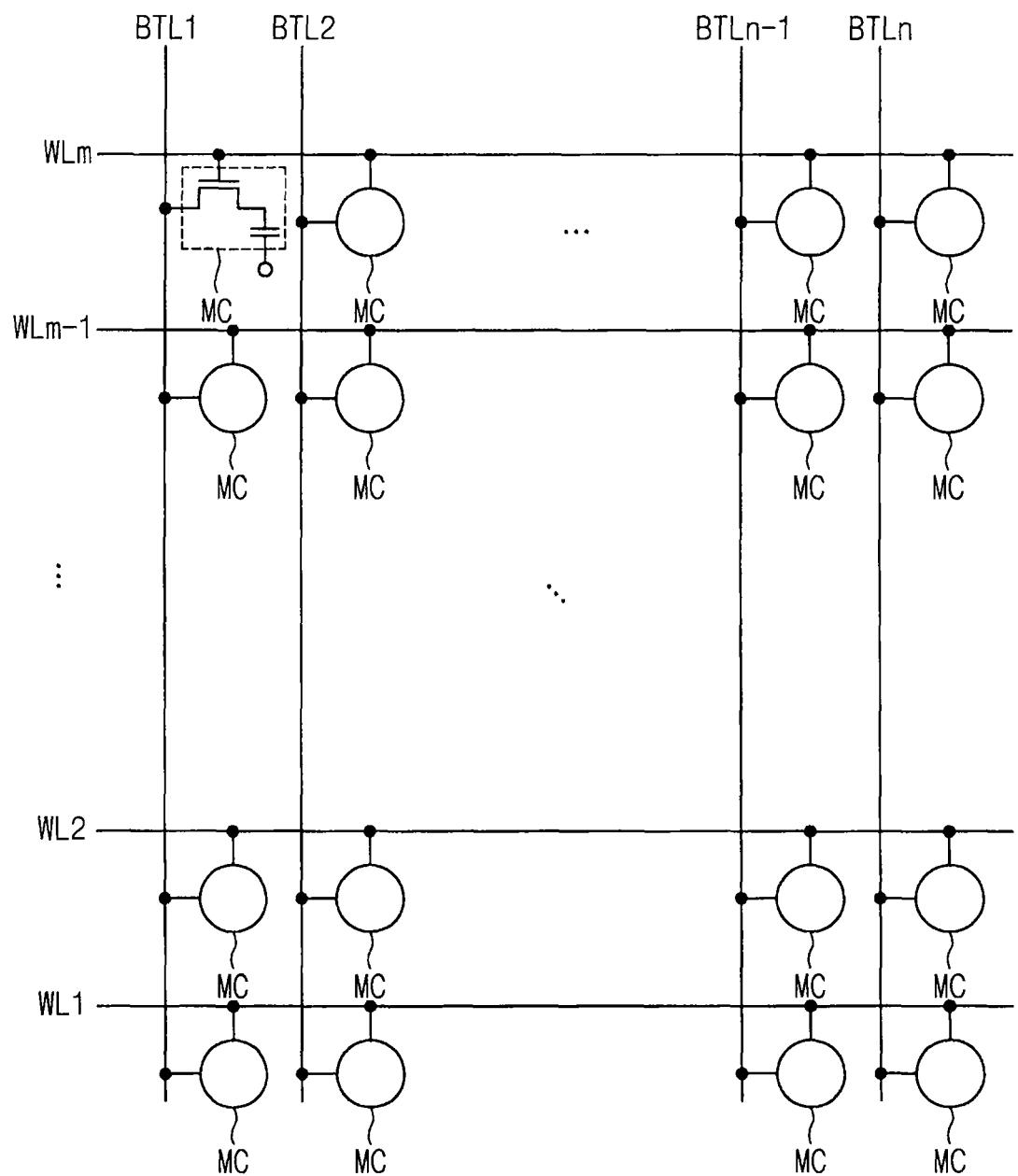
FIG. 3 illustrates an example of the first bank array in the semiconductor memory device of FIG. 2.

FIG. 3 illustrates an example of the first bank array 310a in the semiconductor memory device 200 of FIG. 2.

Referring to FIG. 3, the first bank array 310a may include a plurality of word-lines WL1-WLm (where m is a natural number greater than two), a plurality of bit-lines BTL1-BTLn (where n is a natural number greater than two), and a plurality of memory cells MCs disposed at intersections between the word-lines WL1-WLm and the bit-lines BTL1-BTLn. Each of the memory cells MCs may include an access (cell) transistor coupled to one of the word-lines WL1-WLm and one of the bit-lines BTL1-BTLn and a storage (cell) capacitor coupled to the cell transistor.

Figure 4:
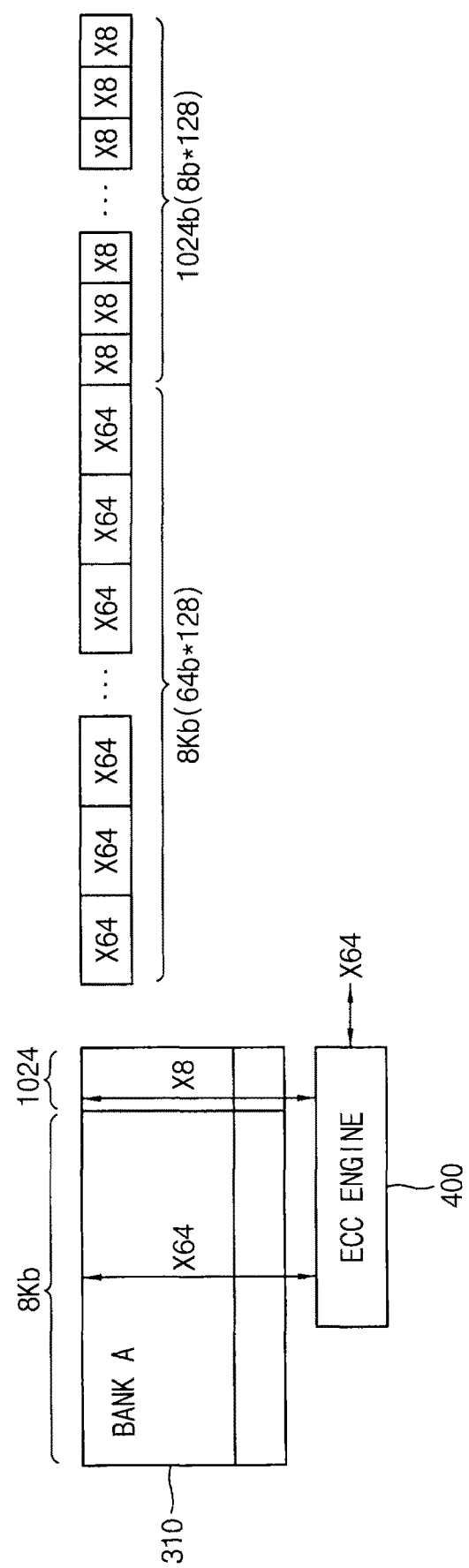
FIG. 4 illustrates a bank array and the ECC engine shown in the semiconductor memory device of FIG. 2.

FIG. 4 illustrates the first bank array 310a and the ECC engine 400 shown in the semiconductor memory device of FIG. 2.

In FIG. 4, the first bank array 310a is illustrated for convenience, however, the details discussed herein related to the first bank array 310a may be applied to the other banks of the bank array 310a-310s.

Referring to FIG. 4, the first bank array 310a may be divided into pages, with each page including sub-pages and parity data associated with respective ones of the sub-pages. For example, each page of the first bank array 310a may have a size of 8 Kb and each sub-page of the page may have a size of 64b, though the inventive concepts are not limited thereto. A parity data of 8b may be stored for each sub-page. Thus, in this example, the first bank array 310a may include 128 sub-pages and 1024 parity bits associated with a given page of the first bank array 310a. Data from each sub-page having a size of 64b and corresponding parity data having a size of 8b may be sequentially read and provided to the ECC engine 400. The page and sub-page size of FIG. 4 are examples only and are not intended to limit the inventive concepts.

Figure 5:
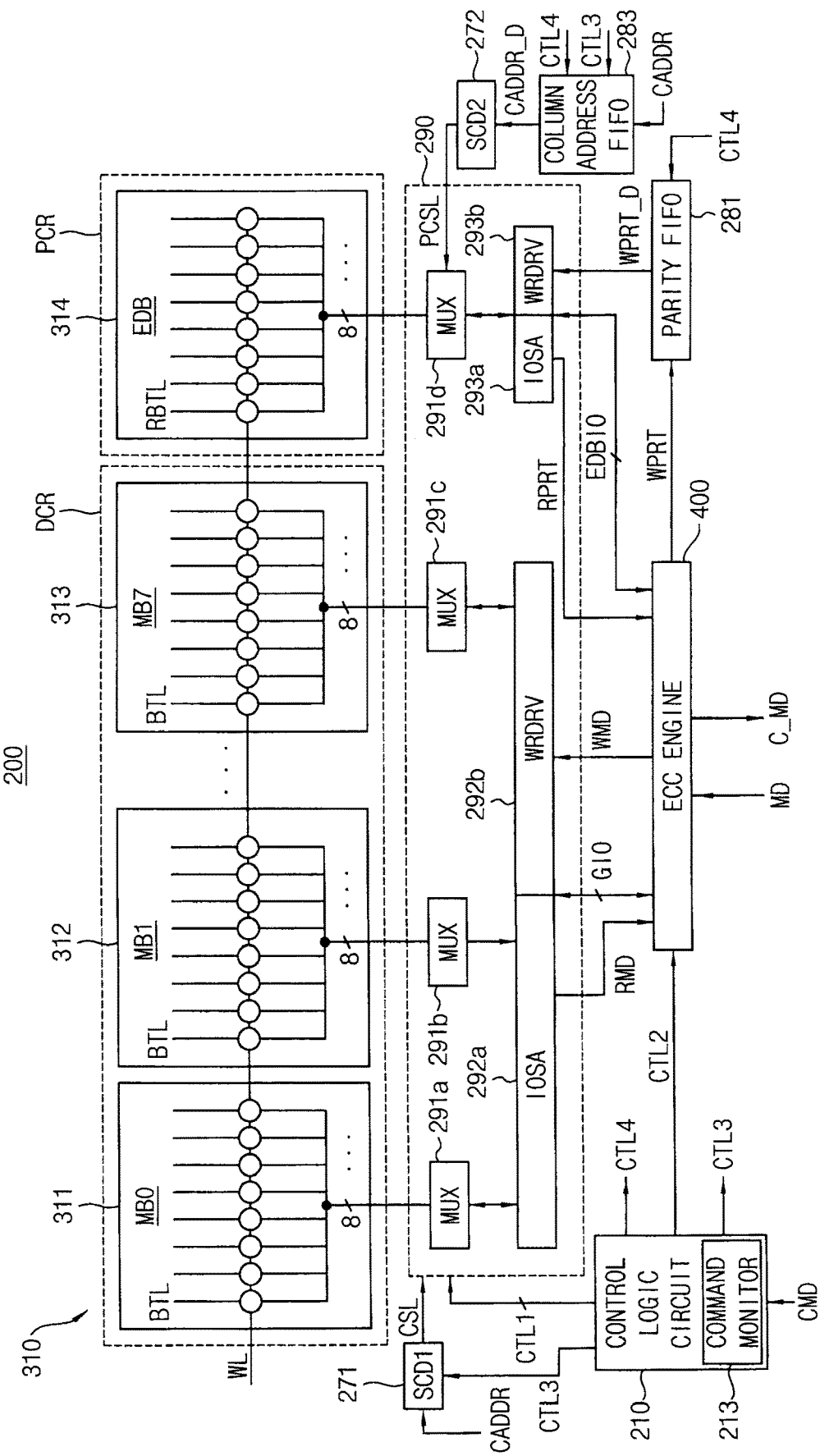
FIG. 5 illustrates a portion of the semiconductor memory device of FIG. 3 during a write operation and a read operation.

FIG. 5 illustrates a portion of the semiconductor memory device 200 of FIG. 3 during a write operation and a read operation.

In FIG. 5, the control logic circuit 210, the first bank array 310a, the I/O gating circuit 290, the ECC engine 400, a parity first-in first-out (FIFO) buffer 281, and address FIFO buffer 283, a first sub column decoder 271, and a second sub column decoder 272 are illustrated.

Referring to FIG. 5, the first bank array 310a may include a data region DCR and a parity region PCR. The data region DCR may include a plurality of first memory blocks MB0-MB7, i.e., 311-313, and the parity region PCR may include at least a second memory block 314. The number of first memory blocks 311-313 and the number of second memory blocks 314 illustrated in FIG. 5 are provided as an example and are not intended to limit the inventive concepts. The first memory blocks 311-313 may be memory blocks that determine a memory capacity of the semiconductor memory device 200. The second memory block 314 may be used for ECC and/or redundancy repair.

In each of the first memory blocks 311-313, a plurality of first memory cells may be arranged in rows and columns. In the second memory block 314, a plurality of second memory cells may be arranged in rows and columns.

The I/O gating circuit 290 may include a plurality of switching circuits 291a-291d respectively connected to the first memory blocks 311-313 and the second memory block 314. The I/O gating circuit 290 may further include an I/O sense amplifier 292a and a write driver 292b connected to the data region DCR through the switching circuits 291a-291c and an I/O sense amplifier 293a and a write driver 293b connected to the parity region PCR through the switching circuit 291d. In the semiconductor memory device 200, bit-lines corresponding to data of a burst length (BL) may be simultaneously accessed to support the BL indicating the maximum number of column positions that is accessible. For example, the BL may be set to 8.

The ECC engine 400 may be connected to the switching circuits 291a-291d through first data lines GIO and second data lines EDBIO.

The control logic circuit 210 may decode the command CMD to generate the first control signal CTL1 for controlling the switching circuits 291a-291d and the second control signal CTL2 for controlling the ECC engine 400. The control logic circuit 210 may provide a third control signal CTL3 to the address FIFO buffer 283 and the first sub column decoder 271 and may provide a fourth control signal CTL4 to the parity FIFO buffer 281 and the address FIFO buffer 283.

The control logic circuit 210 may include a command monitor 213 that monitors receiving timings of a first command CMD and a second command CMD received from the memory controller 100.

When the first command CMD is a (normal) write command (e.g., a non-masked write command), the control logic circuit 210 may provide the first control signal CTL1 to the I/O gating circuit 290 such that the write data MD is written in a target page in the data region DCR and may provide the second control signal CTL2 to the ECC engine 400. The ECC engine 400 may perform an ECC encoding on the write data MD based on the second control signal CTL2 to generate a write parity data WPRT and may store the write parity data WPRT in the parity FIFO buffer 281. In some embodiments, the ECC engine 400 may provide the write data MD as write data WMD to the I/O gating circuit 290 to be written to the data region DCR.

The control logic circuit 210 may adjust a first write timing to write the write parity data (WPRT) in the parity region PCR based on whether the second command CMD successive to the first command CMD is received within a reference time interval.

For example, responsive to the control logic circuit 210 receiving the second command CMD before the reference time interval expires, the control logic circuit 210 may control the I/O gating circuit 290, the address FIFO buffer 283, and/or the parity FIFO buffer 281 such that the write parity data (the first parity data) WPRT is written in the parity region PCR at a second timing when a write data WMD (a second write data) associated with and/or received by the second command CMD is written in the data region DCR.

For example, responsive to the control logic circuit 210 receiving the second command CMD after the reference time interval expires, the control logic circuit 210 may control the I/O gating circuit 290, the address FIFO buffer 283, and/or the parity FIFO buffer 281 such that the write parity data WPRT is written in the parity region PCR in response to an internal write command that the control logic circuit 210 generates at a second timing when the reference time interval ends.

For example, responsive to the first command (e.g., a first write command) designating a masked write operation, the control logic circuit 210 may control the I/O gating circuit 290 and the ECC engine 400 to perform a read-modify operation such that: the I/O gating circuit 290 selects a sub-page of a target page corresponding to a target address received by and/or associated with the first command, to read a data and a parity data from the sub-page, and to provide the data and the parity data to the ECC engine 400 as a read data RMD and a read parity data RPRT; and the ECC engine 400 corrects at least one error bit in the read data RMD based on the read parity data RPRT to generate a corrected data to generate the first parity data based on the corrected data and the first write data and to store the first parity data in the parity FIFO buffer 281.

For example, responsive to the first command (e.g., a first write command) designating a masked write operation, the ECC engine 400 may perform an ECC encoding on the write data MD to generate the first parity data under control of the control logic circuit 210 and store the first parity data in the parity FIFO buffer 281.

For example, responsive to the first command designating a read operation, the I/O gating circuit 290 may read a data and a parity data from the sub-page, and provide the data and the parity data to the ECC engine 400 as a read data RMD and a read parity data RPRT under control of the control logic circuit 210. The ECC engine 400 may correct at least one error bit in the read data RMD based on the read parity data RPRT to generate a corrected data C_MD and may provide the corrected data C_MD to the data I/O buffer 295.

The first sub column decoder 271 may decode the column address CADDR and may activate a column selection signal CSL to access the data region DCR in response to the third control signal CTL3.

The parity FIFO buffer 281 may store the write parity data WPRT and provide the write driver 293b with a delayed write parity data WPRT_D in response to the fourth control signal CTL4. The parity FIFO buffer 281 may provide the write driver 293b with a delayed write parity data WPRT_D at a write timing to write the second write data MD or at a timing when the internal write command is generated in response to the fourth control signal CTL4.

The address FIFO buffer 283 may store the column address CADDR and may provide the second sub column decoder 272 with a delayed column address CADDR_D in response to at least one of the third control signal CTL3 and the fourth control signal CTL4. The address FIFO buffer 283 may provide the second sub column decoder 272 with the delayed column address CADDR_D at a write timing to write the second write data MD or at the timing when the internal write command is generated in response to the fourth control signal CTL4.

The second sub column decoder 272 may decode the delayed column address CADDR_D and activate a parity column selection signal PCSL to access the parity region PCR.

In some embodiments, the first sub column decoder 271 and the second sub column decoder 272 may be included in the bank column decoder 270a in FIG. 2.

Figure 6:
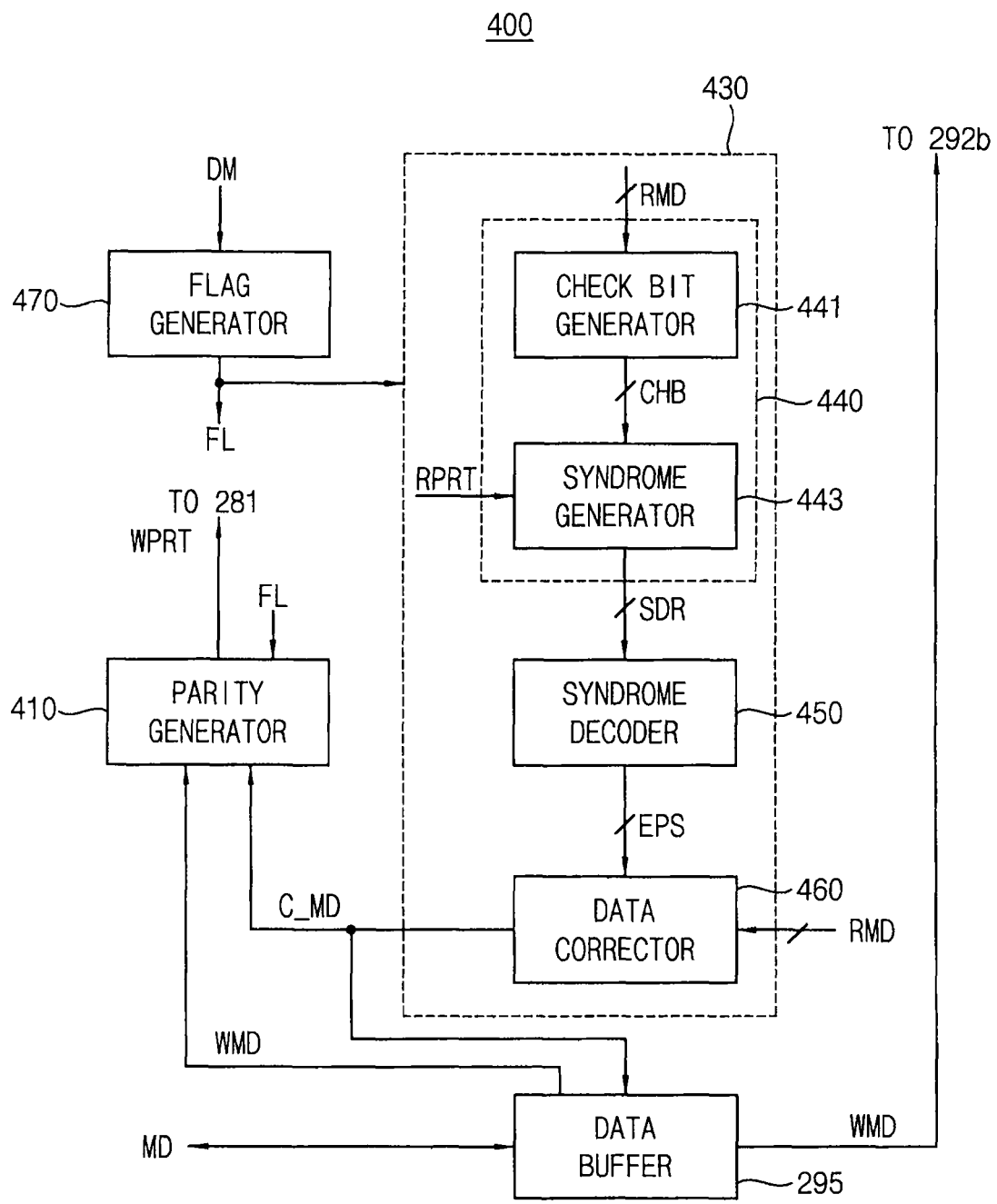
FIG. 6 is a block diagram illustrating an example of the ECC engine in FIG. 5 according to example embodiments of the inventive concepts.

FIG. 6 is a block diagram illustrating an example of the ECC engine 400 in FIG. 5 according to example embodiments of the inventive concepts.

In FIG. 6, the data I/O buffer 295 is included in the illustration for convenience of explanation.

Referring to FIG. 6, the ECC engine 400 may include a parity generator 410, an ECC decoder 430, and a flag generator 470.

The ECC decoder 430 may include a syndrome generation circuit 440, a syndrome decoder 450, and a data corrector 460. The syndrome generation circuit 440 may include a check bit generator 441 and a syndrome generator 443.

In some embodiments, the syndrome generation circuit 440 may be connected to the memory cell array 300 (e.g., the first bank array 310a) through the I/O gating circuit 290, the syndrome decoder 450 may be connected to the syndrome generation circuit 440, and the data corrector 460 may be connected to the syndrome decoder 450.

The flag generator 470 may receive the data mask signal DM, may output a flag signal FL with a first logic level (e.g., a high level) when the data mask signal DM designates a masked write operation and may output the flag signal FL with a second logic level (e.g., a low level) when the data mask signal DM designates a normal (e.g., a non-masked) write operation. The flag generator 470 may provide the flag signal FL to the parity generator 140 and/or the ECC decoder 430.

The parity generator 410 may generate the write parity data WPRT using a write data WMD or may merge the write data WMD and the corrected data C_MD to generate the write parity data WPRT, based on the flag signal FL. In some embodiments, the write data WMD may be associated with the data MD provided to the ECC engine 400 by the data I/O buffer 295. For example, in some embodiments the write data WMD may correspond to the data MD when the command CMD is a write command.

The parity generator 410 may generate the write parity data WPRT by performing an ECC encoding on the write data WMD or generate the write parity data WPRT by merging the write data WMD and the corrected data C_MD and performing an ECC encoding on the merged data, based on the flag signal FL.

The check bit generator 441 may generate check bits CHB based on a read data RMD. The syndrome generator 443 may generate syndrome data SDR by performing bit-wise comparison on corresponding bits of read parity data RPRT and the check bits CHB.

The syndrome decoder 450 may decode the syndrome data SDR to generate error position signals indicating a position of at least one error bit in the read data RMD.

The data corrector 460 may receive the error position signals EPS and the read data RMD, may correct at least one error bit in the read data RMD, and may provide the corrected data C_MD to the parity generator 410 and the data I/O buffer 295.

In the masked write operation, the data corrector 460 may provide the corrected data C_MD to the parity generator 410 and, in the read operation, the data corrector 460 may provide the corrected data C_MD to the parity generator 410 and the data I/O buffer 295.

Figure 7:
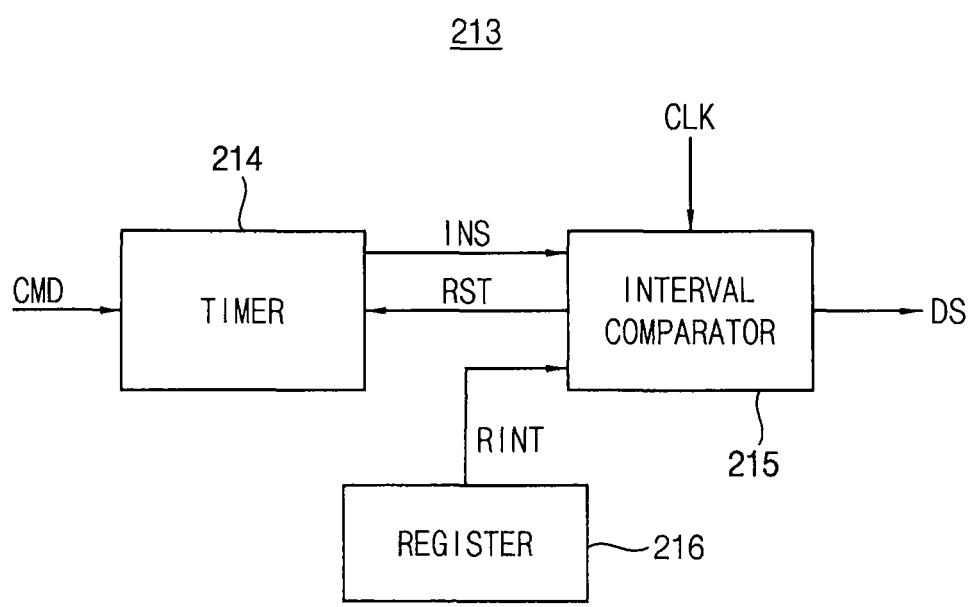
FIG. 7 is a block diagram illustrating an example of the command monitor in FIG. 5 according to example embodiments of the inventive concepts.

FIG. 7 is a block diagram illustrating an example of the command monitor 213 in FIG. 5 according to example embodiments of the inventive concepts.

Referring to FIG. 7, the command monitor 213 may include a timer 214, an interval comparator 215, and a register 216. The register 216 may store a time interval corresponding to a reference time interval RINT and/or the toggling number of the clock signal CLK during the reference time interval RINT.

The timer 214 may receive the command CMD (e.g., the first command and/or the second command), generate an interval signal INS having a predetermined pulse width when the command CMD is received, and provide the interval signal INS to the interval comparator 215.

The interval comparator 215 may start a counting operation of counting the clock signal CLK at a time point at which the interval signal INS corresponding to the first command CMD is applied, and may output a decision signal DS having a first pulse width responsive to the second command CMD being applied before the reference time interval RINT expires.

The interval comparator 215 may output the decision signal DS having a second pulse width at a time point when the reference time interval RINT ends responsive to the reference time interval RINT expiring without receiving the second command CMD, or responsive to the second command CMD being applied after the reference time interval RINT expires.

In addition, interval comparator 215 may apply a reset signal RST to the timer 214 to reset the timer 214 when the interval comparator 215 outputs the decision signal DS.

FIGS. 8 and 9 illustrate the main data and the data mask signal according to example embodiments of the inventive concepts.

Referring to FIGS. 8 and 9, the main data MD may include a plurality of unit data UN1-UNr (r is a natural number greater than two) and each of the unit data UN1-UNr may include a plurality of data bits. The data mask signal DM may include a plurality of mask bits DMB1-DMBr corresponding to the unit data UN1-UNr.

Each of the mask bits DMB1-DMBr may indicate whether to write a corresponding one of the unit data UN1-UNr. A mask bit having a first logic level, of the mask bits DMB1-DMBr indicates that a corresponding unit data is masked.

As illustrated in FIG. 8, when at least one of the mask bits DMB1-DMBr has a first logic level (e.g., '1'), a masked write operation may be performed on the main data MD. As illustrated in FIG. 9, if all of the mask bits DMB1-DMBr have a second logic level (e.g., '0'), a normal (e.g., a non-masked) write operation may be performed on the main data MD.

FIG. 10 illustrates an example of the flag generator in FIG. 6 according to example embodiments of the inventive concepts.

Referring to FIG. 10, the flag generator 470 may include an OR gate 471 and the OR gate 471 performs an OR operation on the mask bits DMB1-DMBr to output the flag signal FL.

When at least one of the mask bits DMB1-DMBr has a first logic level (e.g., '1'), the flag signal FL has a first logic level and designates the masked write operation.

When all of the mask bits DMB1-DMBr have a second logic level (e.g., '0'), the flag signal FL has a second logic level and designates the normal (e.g., non-masked) write operation.

Figure 11:
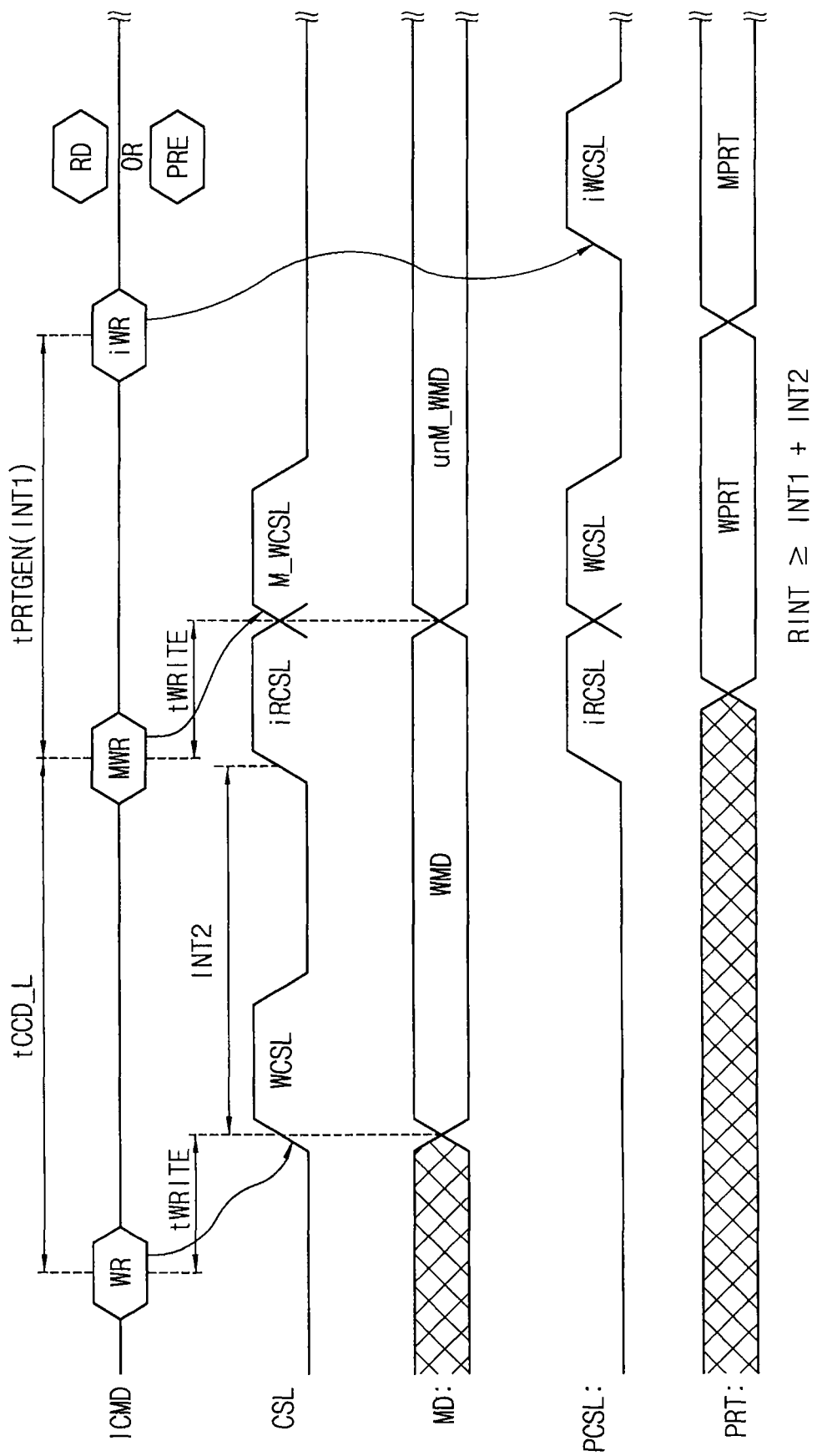
FIG. 11 is a timing diagram illustrating an example operation of the semiconductor memory device of FIG. 5 according to example embodiments of the inventive concepts.

FIG. 11 is a timing diagram illustrating an example operation of the semiconductor memory device of FIG. 5 according to example embodiments of the inventive concepts.

Referring to FIGS. 5 through 7 and 11, when an internal command ICMD, which is generated by the control logic circuit 210 in response to the write command from the memory controller 100, designates a write operation WR, a write column selection signal WCSL may be activated if a time interval tWRITE elapses since the write operation WR is designated, and the write data WMD may be written in a target page in the data region DCR if the write column selection signal WCSL is activated.

Here, the time interval tWRITE may denote a time interval which starts when the write operation WR is initiated and ends before the write data WMD is written. That is, the time interval tWRITE may represent an asynchronous delay corresponding to a time interval which starts when the internal write command is generated and ends when the write data WMD is written in a target page in the data region DCR.

Particularly, a write signal designating the write operation WR may be generated inside of the semiconductor memory device 200 when a time interval corresponding to a sum of a write latency and a half of a burst length elapses from a time point when the control logic circuit 210 receives the write command from the memory controller 100.

The command CMD designating the marked write operation MWR may be provided from the memory controller 100 after a column access delay time tCCD_L elapses from when the write operation WR is designated. It is assumed that the column access delay time tCCD_L is smaller than the reference time interval RINT. An internal read column selection signal iRCSL for reading the data and the parity data from a sub page of the target page may be activated in response to an internal command ICMD designating the masked write operation MWR and the data and the parity data from the subpage may be provided to the ECC engine 400 as a read data and a read parity data.

If the time interval tWRITE elapses from a time point when the masked write operation WMR is designated, a mask write column selection signal M_WCSL may be activated, and unmasked write data unM_WMD may be written in the target page in the data region DCR when the mask write column selection signal M_WCSL is activated.

A write column selection signal WCSL of the parity region PCR may be activated at a time point when the mask write column selection signal M_WCSL is activated, and the write parity data WPRT generated based on the write data WMD may be written in a corresponding region of the parity region PCR in response to the activated write column selection signal WCSL.

During a time interval tPRTGEN (also illustrated as INT1), the ECC engine 400 may merge the unmasked write data unM_WMD and the read data to generate a parity data MPRT corresponding to the merged data since the masked write operation MWR is designated.

Because a new command is not received by the control logic circuit 210 during a time interval corresponding to a sum of a first time interval INT1 and a second time interval INT2 since the masked write operation MWR is designated, the control logic circuit 210 may generate an internal write command iWR at a time point when the time interval tWRITE ends and an internal write column selection signal iWCSL associated with the parity region PCR may be activated in response to the internal write command iWR.

Here, the first time interval INT1 corresponds to the time interval tPRTGEN during which the ECC engine 400 generates a first parity data based on the first write data and the second time interval INT2 corresponds to an interval from a first time point at which the first write data WMD received by and/or with the first command is written in the target page in the data region DCR to a second time point at which the first write data WMD can be read from the target page in the data region DCR. The reference time interval RINT may be equal to or greater than a sum of the first time interval INT1 and a second time interval INT2. The second time interval INT2 corresponds to a time interval which starts when the write column selection signal WCSL is activated and ends just before the internal read column selection signal iRCSL is activated.

When the internal write column selection signal iWCSL is activated, the parity data MPRT corresponding to the merged data may be written in a corresponding location in the parity region PCR. Here, the time interval tPRTGEN corresponds to a time interval during which the ECC engine 400 generates the parity data MPRT based on the merged data.

A read operation RD or a precharge operation PRE may be designated in response to a command from the memory controller 100 after the internal write command iWR is generated.

Figure 12:
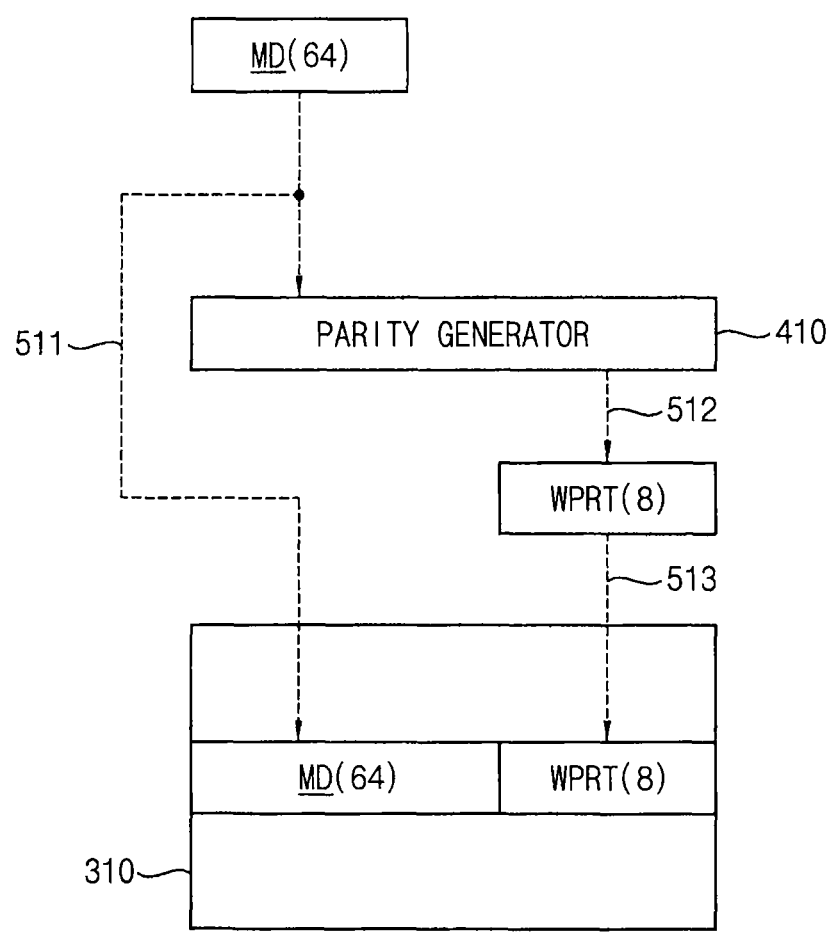
FIG. 12 illustrates the semiconductor memory device of FIG. 5 performing a normal write operation.

FIG. 12 illustrates the semiconductor memory device 200 of FIG. 5 performing a normal (e.g., non-masked) write operation.

Referring to FIGS. 5, 8 through 10 and 12, when the flag signal FL has a second logic level and designates the normal write operation, the parity generator 410 may generate 8-bit write parity data WPRT based on 64-bit write data MD as a reference numeral 512 indicates, the ECC engine 400 may write the 64-bit write data MD in the target page of the data region DCR in the first bank array 310a as a reference numeral 511 indicates, and then the ECC engine 400 may write the 8-bit write parity data WPRT in a corresponding location of the parity region PCR in the first bank array 310a as a reference numeral 513 indicates.

Figure 13:
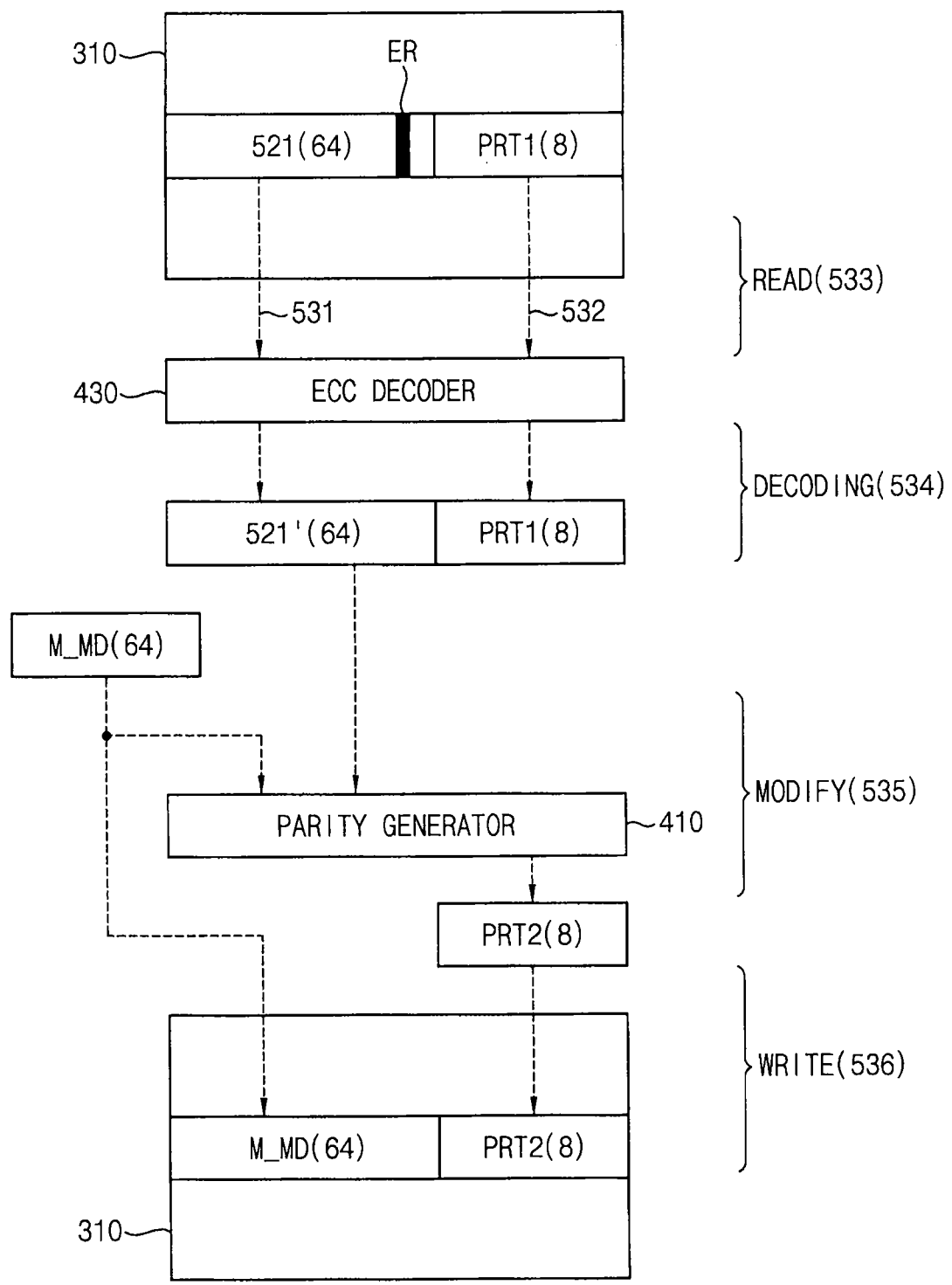
FIG. 13 illustrates the semiconductor memory device of FIG. 5 performing a masked write operation according to example embodiments of the inventive concepts.

FIG. 13 illustrates the semiconductor memory device 200 of FIG. 5 performing a masked write operation.

Referring to FIGS. 5, 8 through 10 and 13, when the flag signal FL has a first logic level and designates the masked write operation, the I/O gating circuit 290 may perform a read operation as a reference numeral 533 indicates and may read the data 521 and a first parity data PRT1 from a sub-page of the target page in the first bank array 310a to provide the data 521 and the first parity data PRT1 to the ECC decoder 430 as reference numerals 531 and 532 respectively indicate.

The ECC decoder 430 may perform an ECC decoding on the data 521 based on the first parity data PRT1 as a reference numeral 534 indicates and may provide a corrected data 521' to the parity generator 410

The parity generator 410 may merge (e.g., modify) masked write data M_MD and the corrected data 521' to generate a second parity data PRT2 as a reference numeral 535 indicates. The I/O gating circuit 290 may write the second parity data PRT2 in a corresponding location of the parity region PCR in the first bank array 310a after writing the masked write data M_MD in a target memory location in the first bank array 310a as a reference numeral 536 indicates.

In FIG. 13, the data 521 may include 64 bits and may include an error bit ER, and the corrected data 521' may include 64 bits. The first parity data PRT1 may include 8 bits and the second parity data PRT2 may include 8 bits.

Figure 14:
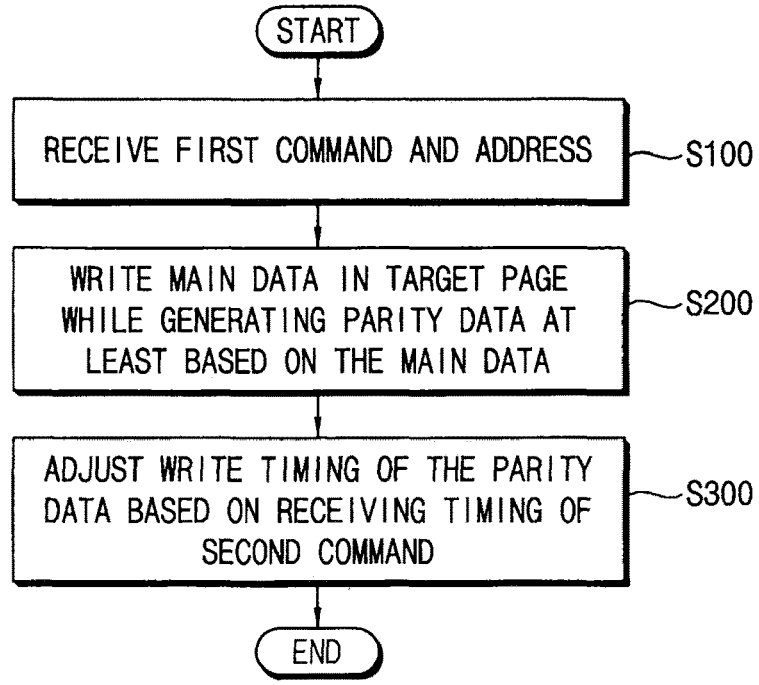
FIG. 14 is a flowchart illustrating a method of operating a semiconductor memory device according to example embodiments of the inventive concepts.

FIG. 14 is a flow chart illustrating a method of operating a semiconductor memory device 200 according to example embodiments of the inventive comments.

Referring to FIGS. 2 through 14, there is provided a method of operating a semiconductor memory device 200 that includes a memory cell array 300 including a data region and a parity region, an ECC engine 400, and a control logic circuit 210 to control the ECC engine 400.

In the method, the control logic circuit 210 may receive a first command and a first address from an external memory controller 100 in operation S100.

The control logic circuit 210 may control the ECC engine 400 and the I/O gating circuit 290 such that the ECC engine 400 generates a first parity data based on a main data (e.g., write data) associated with and/or received by and/or with the first command while I/O gating circuit 290 writes the main data in a target page in the data region in operation S200.

The control logic circuit 210 may adjust a first write timing to write the first parity data in the parity region based on a receiving timing of a second command from the memory controller 100 in operation S300.

Figure 15:
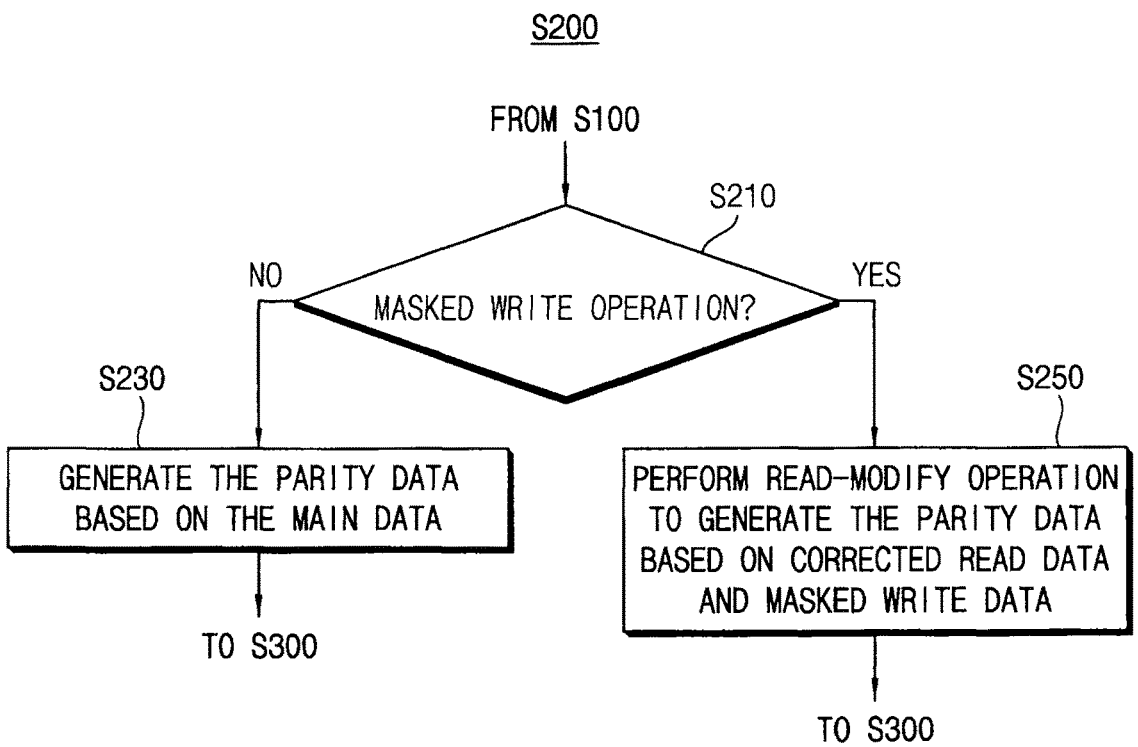
FIG. 15 is a flowchart illustrating the generation of the first parity data while writing the write data in the data region in FIG. 14.

FIG. 15 is a flow chart illustrating operation of generating the first parity data while writing the write data in the data region in FIG. 14.

Referring to FIGS. 2 through 15, for generating the first parity data while writing the main data (e.g., write data) in the data region in operation S200, the control logic circuit 210 determines whether the first command designates a masked write operation in operation S210.

When the first command designates a normal (e.g., not a masked operation) write operation (NO in S210), the control logic circuit 210 may control the ECC engine 400 to generate a first parity data based on the main data in operation S230.

When the first command designates the masked write operation (YES in S210), the control logic circuit 210 may control the ECC engine 400 and the I/O gating circuit 290 to perform a read-modify operation in the background (e.g., concurrently with other operations) to generate the first parity data in operation S250.

The control logic circuit 210 may control the ECC engine 400 and the I/O gating circuit to perform the read-modify operation such that: the I/O gating circuit 290 selects a sub-page of a target page corresponding to the target address received by the first command, reads a data and a parity data from the sub-page, and provides the data and the parity data to the ECC engine 400 as a read data and a read parity data; and the ECC engine 400 corrects at least one error bit in the read data based on the read parity data to generate a corrected data and to generate the first parity data based on the corrected data and the first write data.

Figure 16:
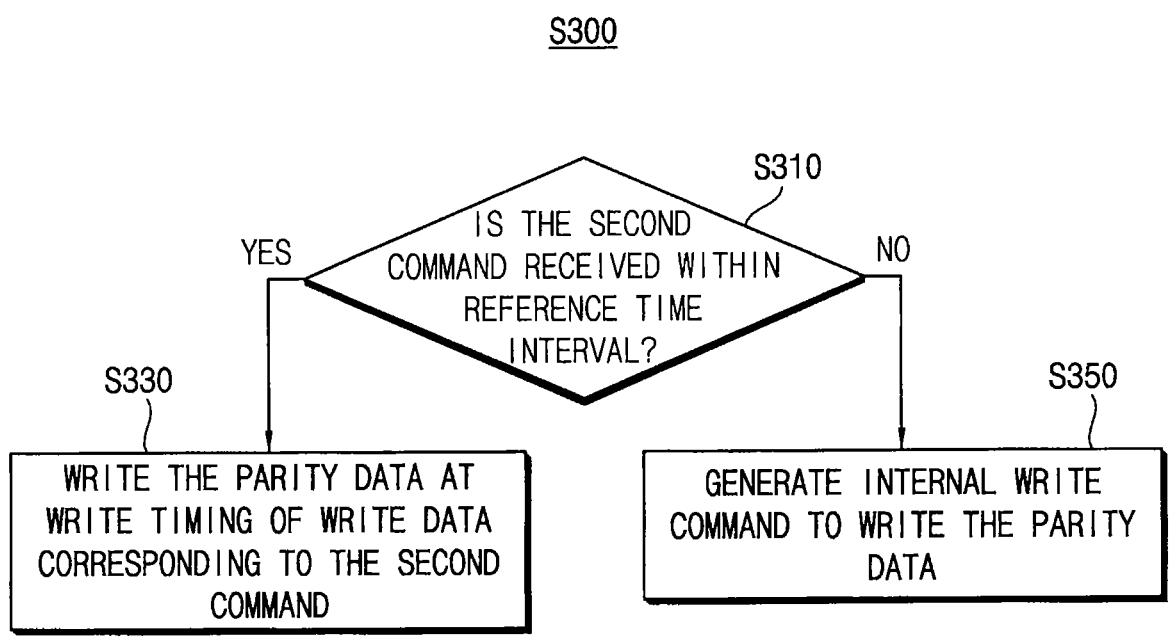
FIG. 16 is a flowchart illustrating the performance of a read-modify operation in FIG. 14.

FIG. 16 is a flow chart illustrating operation of performing a read-modify operation in FIG. 14.

Referring to FIGS. 2 through 14 and 16, for performing a read-modify operation to generate the first parity data in operation S300, the control logic circuit 210 may determine whether the second command is received before a reference time interval expires in operation S310.

If the second command is received before the reference time interval expires (YES in S310), the control logic circuit 210 may control the ECC engine 400 and the I/O gating circuit 290 such that the first parity data is written in the parity region at a second timing when a second write data received by the second command is written in the data region in operation S330.

If the second command is received after the reference time interval expires (NO in S310), the control logic circuit 210 may control the ECC engine 400 and the I/O gating circuit 290 such that the first parity data is written in the parity region in response to an internal write command which the control logic circuit 210 generates at a second timing when the reference time interval ends in operation S350.

As mentioned above, the reference time interval corresponds to a time interval during which the parity generator 410 generates the first parity data based on the write data or the merged data.

The control logic circuit 210 may control the I/O gating circuit 290, the address FIFO buffer 283, and/or the parity FIFO buffer 281 such that the first write data and the first parity data are written in the data region and the parity region, respectively, based on a same column address at different timings (e.g., at different times). The control logic circuit 210 may control I/O gating circuit 290, the address FIFO buffer 283, and/or the parity FIFO buffer 281 such that the first write data and the first parity data are written in the data region DCR and the parity region PCR, respectively, based on column selection signals which are activated at different timings (e.g., at different times). Thus, the first write data may be written in the data region at a first time and the first parity data may be written in the parity region at a second time that is subsequent to the first time, based on a same column address.

In addition, the control logic circuit 210 may include generation of the first parity data in a background operation of the semiconductor memory device 200 such that writing the write data is not affected by the generation of the first parity data. Therefore, the semiconductor memory device 200 may separate the write timings of the write data and the parity data and may enhance performance.

Figure 17:
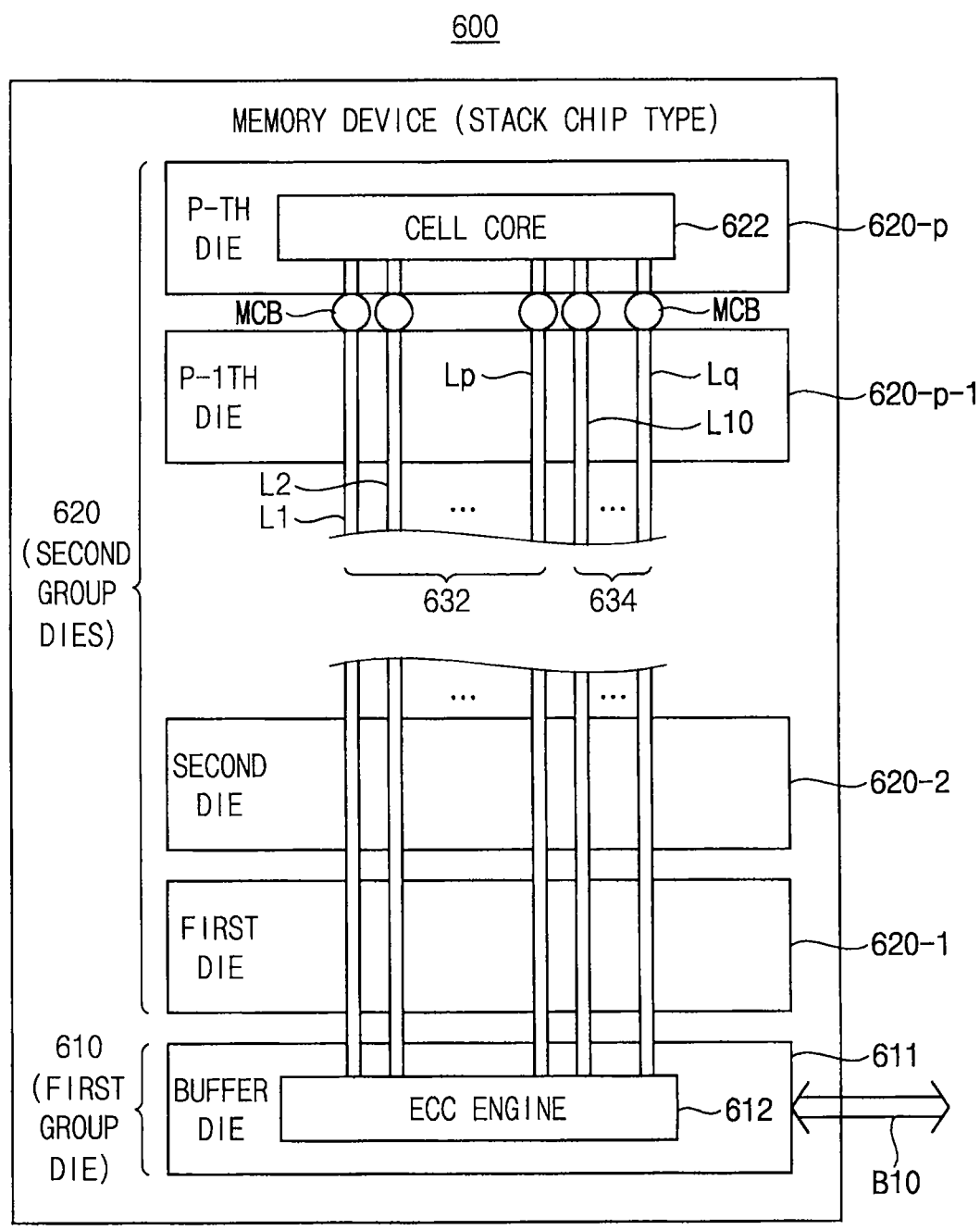
FIG. 17 is a block diagram illustrating a semiconductor memory device according to example embodiments of the inventive concepts.

FIG. 17 is a block diagram illustrating a semiconductor memory device 600 according to example embodiments of the inventive concepts.

Referring to FIG. 17, a semiconductor memory device 600 may include a first group die 610 and second group dies 620 providing a soft error analyzing and correcting function in a stacked chip structure. In some embodiments, the second group dies 620 may be a high-bandwidth memory (HBM).

The first group die 610 may include at least one buffer die 611. The second group dies 620 may include a plurality of memory dies 620-1 to 620-p which may be stacked on the first group die 610 and may convey data through a plurality of silicon via (TSV) lines.

Each of the memory dies 620-1 to 620-p may include a cell core 622 and the cell core 622 may include a memory cell array including a data region and a parity region, an I/O gating circuit and a control logic circuit, such as those according to the inventive concepts described herein.

The buffer die 611 may include an ECC engine 612 which corrects a transmission error using the transmission parity bits when a transmission error is detected from the transmission data received through the TSV lines and generate error-corrected data. The ECC engine 612 may be referred to as a via ECC engine.

In some embodiments, the semiconductor memory device 600 may be a stack chip type memory device or a stacked memory device which conveys data and control signals through the TSV lines. The TSV lines may also be called through electrodes.

A transmission error which occurs at the transmission data may be due to noise which occurs at the TSV lines. Since a data failure due to the noise occurring at the TSV lines may be distinguishable from a data failure due to a false operation of the memory die, it may be regarded as soft data failure (or a soft error). The soft data failure may be generated due to a transmission failure on a transmission path, and may be detected and remedied by an ECC operation.

For example, when the transmission data is 64-bit data, the transmission parity bits may be set to 8 bits. However, the scope and spirit of the present inventive concepts are not limited thereto. The number of transmission parity bits may increase or decrease.

With the above description, a TSV line group 632 which is formed at one memory die 620-p may include 64 TSV lines L1 to Lp, and a parity TSV line group 634 may include 8 TSV lines L10 to Lq.

The TSV lines L1 to Lp of the data TSV line group 632 and the parity TSV lines L10 to Lq of the parity TSV line group 634 may be connected to micro bumps MCB which are correspondingly formed among the memory dies 620-1 to 620-p.

Each of the memory dies 620-1 to 620-p may include DRAM cells each including at least one access transistor and one storage capacitor.

The semiconductor memory device 600 may have a three-dimensional (3D) chip structure or a 2.5D chip structure to communicate with the host through a data bus B10. The buffer die 611 may be connected with the host through the data bus B10.

The ECC engine 612, denoted as the via ECC circuit, may determine whether a transmission error occurs at the transmission data received through the data TSV line group 632, based on the transmission parity bits received through the parity TSV line group 634. When a transmission error is detected, the ECC engine 612 may correct the transmission error on the transmission data using the transmission parity bits. When the transmission error is uncorrectable, the ECC engine 612 may output information indicating occurrence of an uncorrectable data error.

The ECC engine 612 may employ the ECC engine 400 of FIG. 4. Therefore, the ECC engine 612 may separate providing timings of the write data and the write parity data. In some embodiments, at least one of the memory dies 620-1 to 620-p may employ the ECC engine 400 of FIG. 4. In this case, an ECC engine included in at least one of the memory dies 620-1 to 620-p may separate (adjust) write timings of the write data and the write parity data.

When an error is detected from read data in a high-bandwidth memory (HBM) or the stacked memory structure, the error may be an error occurring due to noise while data is transmitted through the TSV.

According to example embodiments of the inventive concepts, as illustrated in FIG. 17, the ECC engine 612 may be included in the buffer die 611. Accordingly, it may be possible to detect and correct a soft data failure. The soft data failure may include a transmission error which is generated due to noise when data is transmitted through TSV lines.

Figure 18:
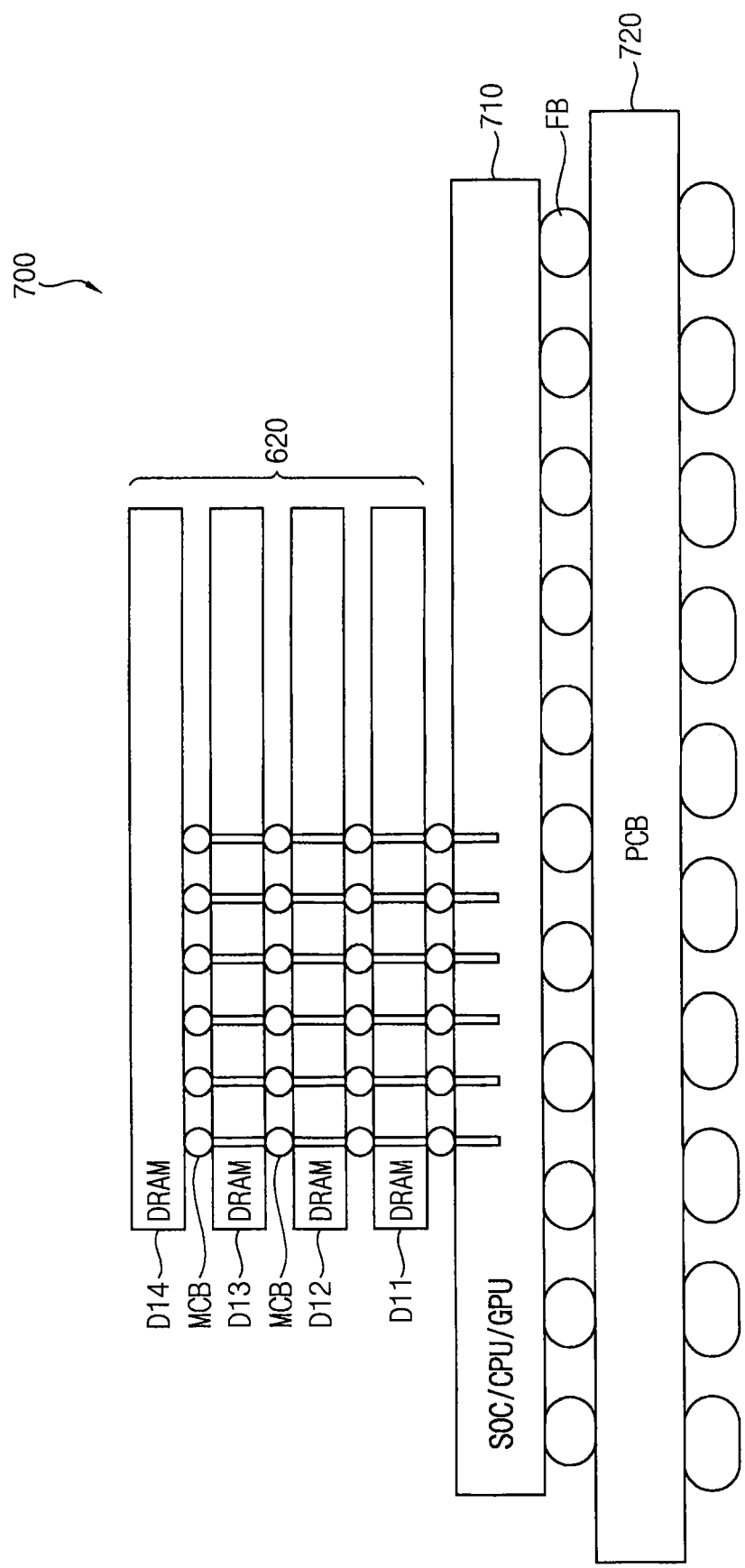
FIG. 18 is a cross-sectional view of a 3D chip structure employing the semiconductor memory device of FIG. 17 according to example embodiments of the inventive concepts.

FIG. 18 is a cross-sectional view of a 3D chip structure 700 employing the semiconductor memory device 600 of FIG. 17 according to example embodiments of the inventive concepts.

FIG. 18 shows a 3D chip structure 700 in which a host and a HBM are directly connected without an interposer layer.

Referring to FIG. 18, a host die 710 such as, for example, a system-on-chip (SoC), a central processing unit (CPU), and/or a graphic processing unit (GPU) may be disposed on a printed circuit board (PCB) 720 using flip chip bumps FB. Memory dies D11 to D14 may be stacked on the host die 720 to implement a HBM structure 620 as the memory dies in FIG. 17. In FIG. 18, the buffer die 611 or a logic die of FIG. 17 is omitted. However, in some embodiments, the buffer die 611 or the logic die may be disposed between the memory die D11 and the host die 720. To implement the HBM (620) structure, TSV lines may be formed at the memory dies D11 and D14. The TSV lines may be electrically connected with micro bumps MCB placed between memory dies.

Figure 19:
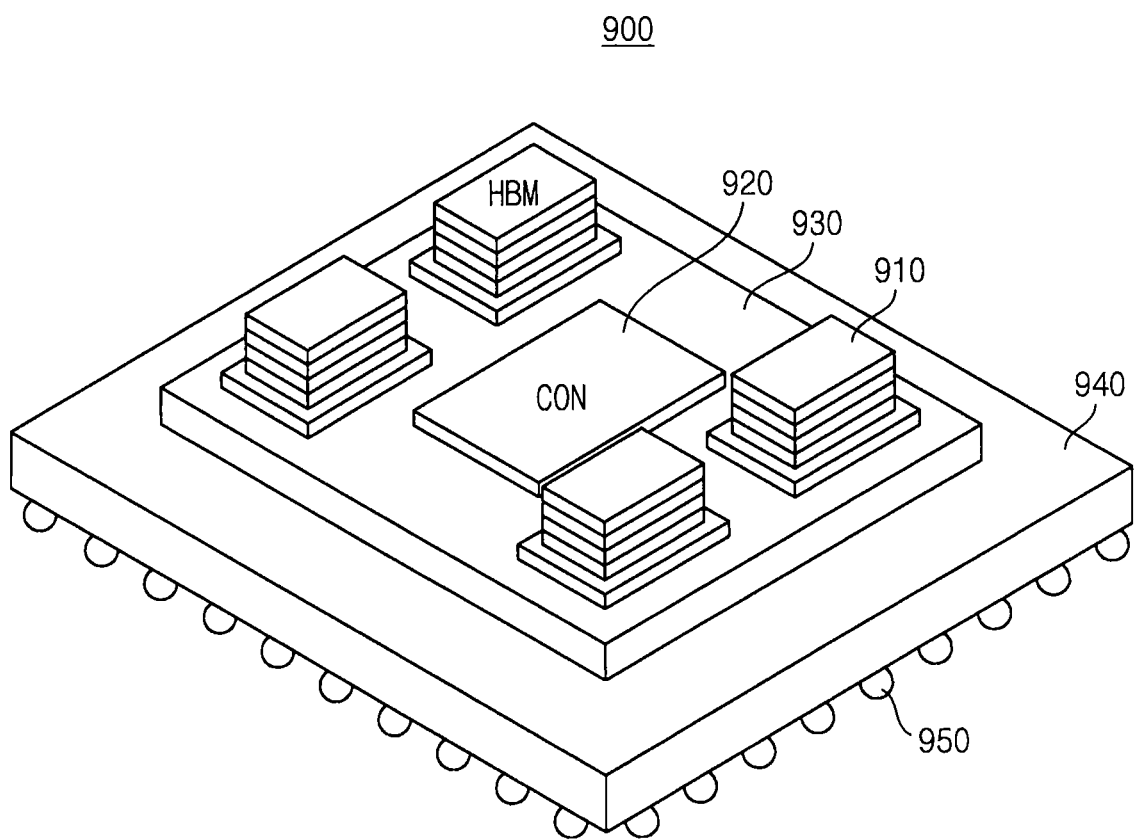
FIG. 19 is a diagram illustrating a semiconductor package including the stacked memory device according to example embodiments of the inventive concepts.

FIG. 19 is a diagram illustrating a semiconductor package 900 including the stacked memory device according to example embodiments of the inventive concepts.

Referring to FIG. 19, a semiconductor package 900 may include one or more stacked memory devices 910 and a memory controller 920.

The stacked memory devices 910 and the memory controller 920 may be mounted on an interposer 930, and the interposer 930 on which the stacked memory devices 910 and the memory controller 920 are mounted may be mounted on a package substrate 940.

In some embodiments, one of the stacked memory devices 910 may employ the semiconductor memory device 600 in FIG. 17 and the memory controller 920 may employ the memory controller 100 in FIG. 1.

Each of the stacked memory devices 910 may be implemented in various forms, and may be a memory device in a high bandwidth memory (HBM) form in which a plurality of layers are stacked. Accordingly, in some embodiments, each of the stacked memory devices 910 may include a buffer die and a plurality of memory dies. The buffer die may include the ECC engine, such as the ECC engine 400 described herein, each of the memory dies may include the memory cell array, such as the memory cell array 300 described herein, and the memory cell array may include the data region (e.g., DCR) and the parity region (e.g., PCR). In addition, each of the memory dies may include the address FIFO buffer and the parity FIFO buffer such as those described herein. Therefore, each of the memory dies may separate write timings of the write data and the write parity data and may adjust write timing of the parity data.

The plurality of stacked memory devices 910 may be mounted on the interposer 930, and the memory controller 920 may communicate with the plurality of stacked memory devices 910. For example, each of the stacked memory devices 910 and the memory controller 920 may include a physical region, and communication may be performed between the stacked memory devices 910 and the memory controller 920 through the physical regions. In some embodiments, when each of the stacked memory devices 910 includes a direct access region, a test signal may be provided to each of the stacked memory devices 910 through conductive means (e.g., solder balls 950) mounted under package substrate 940 and the direct access region.

As mentioned above, according to example embodiments of the inventive concepts, the semiconductor memory device may adjust a write timing of the parity data based on receiving timings of the first command and the second command. In addition, the semiconductor memory device may include generation of the parity data in the background operation of the semiconductor memory device such that writing of the write data is not affected by the generation of the parity data. Therefore, the semiconductor memory device may separate writing timings of the write data and the write parity data and may enhance performance.

Aspects of the present disclosure may be applied to semiconductor memory devices and various systems using semiconductor memory devices.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concepts. Accordingly, all such modifications are intended to be included within the scope of the present inventive concepts as defined in the claims.

What is claimed is:

1. A semiconductor memory device comprising:
   a memory cell array comprising a data region and a parity region;
   an error correction code (ECC) engine;
   an input/output (I/O) gating circuit connected to the ECC engine and the memory cell array; and
   a control logic circuit configured to generate control signals by decoding a command received from a memory controller,
   wherein the ECC engine is configured to generate a first parity data based on a first write data associated with a first command, and
   wherein the control logic circuit is further configured to adjust a first write timing to write the first parity data in the parity region based on a receiving timing of a second command successive to the first command and a reference time interval.

2. The semiconductor memory device of claim 1, further comprising:
   an address first-in first-out (FIFO) buffer configured to store a column address for accessing the parity region; and
   a parity FIFO buffer configured to store the first parity data.

3. The semiconductor memory device of claim 2, wherein responsive to the control logic circuit receiving the second command before the reference time interval expires, the control logic circuit is further configured to control the I/O gating circuit, the address FIFO buffer, and the parity FIFO buffer such that the first parity data is written in the parity region responsive to a second write data that is associated with the second command being written in the data region.

4. The semiconductor memory device of claim 2, wherein responsive to the control logic circuit receiving the second command after the reference time interval expires, the control logic circuit is further configured to control the I/O gating circuit, the address FIFO buffer, and the parity FIFO buffer such that the first parity data is written in the parity region in response to an internal write command that the control logic circuit generates responsive to expiration of the reference time interval.

5. The semiconductor memory device of claim 2, wherein the control logic circuit is further configured to control the I/O gating circuit, the address FIFO buffer, and the parity FIFO buffer such that the first write data and the first parity data are written in the data region and the parity region, respectively, based on column selection signals, and
   wherein the column selection signals are activated at different timings.

6. The semiconductor memory device of claim 1, wherein the reference time interval is equal to or greater than a sum of a first time interval and a second time interval,
   wherein the first time interval corresponds to an interval during which the ECC engine generates the first parity data based on the first write data, and
   wherein the second time interval corresponds to an interval from a first time point at which the first write data is written to a second time point at which the first write data can be read from the data region.

7. The semiconductor memory device of claim 1, wherein responsive to the first command designating a masked write operation, the control logic circuit is further configured to control the I/O gating circuit and the ECC engine to perform a read-modify operation such that:
   the I/O gating circuit selects a sub-page of a target page corresponding to a target address associated with the first command, reads a data and a parity data from the sub-page, and provides the data and the parity data to the ECC engine as a read data and a read parity data; and
   the ECC engine corrects at least one error bit in the read data based on the read parity data to generate a corrected data and to generate the first parity data based on the corrected data and the first write data.

8. The semiconductor memory device of claim 7, wherein the control logic circuit is further configured to control the I/O gating circuit and the ECC engine to perform the read-modify operation independently of a write operation of the first write data.

9. The semiconductor memory device of claim 1, wherein the control logic circuit is further configured to write the first write data to the data region of the memory cell array at a first time and to write the first parity data to the parity region of the memory cell array at a second time based on whether the second command is received prior to an expiration of the reference time interval.

10. The semiconductor memory device of claim 1, wherein the ECC engine comprises:
    an ECC decoder; and
    a parity generator, and
    wherein the ECC decoder comprises:
    a syndrome generation circuit connected to the memory cell array through the I/O gating circuit;
    a syndrome decoder connected to the syndrome generation circuit; and
    a data corrector connected to the syndrome decoder.

11. The semiconductor memory device of claim 10, wherein, responsive to the first command designating a masked write operation, the syndrome generation circuit is configured to receive a data and a parity data from a sub-page of a target page corresponding to a target address associated with the first command as a read data and a read parity data and to generate a syndrome data based on the read data and the read parity data, the syndrome decoder is configured to decode the syndrome data to generate an error position signal indicating a position of at least one error bit in the read data, and the data corrector is configured to correct the at least one error bit in the read data based on the error position signal to output a corrected data.

12. The semiconductor memory device of claim 11, wherein the parity generator is configured to merge the first write data and the corrected data to generate the first parity data based on a flag signal.

13. The semiconductor memory device of claim 12, further comprising a flag generator configured to generate the flag signal based on a data mask signal designating the masked write operation.

14. The semiconductor memory device of claim 10, wherein responsive to the first command designating a normal write operation, the parity generator is configured to generate the first parity data using the first write data.

15. The semiconductor memory device of claim 1, wherein the control logic circuit comprises a command monitor configured to monitor receiving timings of the first command and the second command, and wherein the control logic circuit is configured to generate the control signals further based on a result of the monitoring.

16. The semiconductor memory device of claim 1, wherein the memory cell array comprises a plurality of memory cells coupled to a plurality of word-lines and a plurality of bits-lines, each of the memory cells comprising an access transistor and a storage capacitor, wherein the semiconductor memory device further comprises:
at least one buffer die; and
a plurality of memory dies, the plurality of memory dies being stacked on the at least one buffer die and conveying data through a plurality of through silicon via (TSV) lines,
wherein the plurality of memory dies comprises the memory cell array, and
wherein the at least one buffer die comprises the ECC engine.

17. A semiconductor memory device comprising:
a memory cell array comprising a data region and a parity region;
an error correction code (ECC) engine;
an input/output (I/O) gating circuit connected to the ECC engine and the memory cell array;
a control logic circuit;
an address first-in first-out (FIFO) buffer configured to store a column address for accessing the parity region; and
a parity FIFO buffer configured to store a first parity data,
wherein the ECC engine is configured to generate the first parity data based on a first write data associated with a first command, and
wherein the control logic circuit is configured to control the I/O gating circuit, the address FIFO buffer, and the parity FIFO buffer such that the first write data is written in the data region at a first time and the first parity data is written in the parity region at a second time that is subsequent to the first time, based on a same column address.

18. The semiconductor memory device of claim 17, wherein responsive to the first command designating a masked write operation, the control logic circuit is further configured to control the I/O gating circuit and the ECC engine to perform a read-modify operation such that:
the I/O gating circuit selects a sub-page of a target page corresponding to a target address received with the first command, reads a data and a parity data from the sub-page, and provides the data and the parity data to the ECC engine as a read data and a read parity data; and
the ECC engine corrects at least one error bit in the read data based on the read parity data to generate a corrected data and to generate the first parity data based on the corrected data and the first write data.

19. A semiconductor memory device comprising:
a memory cell array comprising a data region and a parity region;
an error correction code (ECC) engine configured to write a write data associated with a first command in a target page in the data region and generate a first parity data based on the write data; and
a control logic circuit configured to receive the first command from a memory controller and write the first parity data in the parity region in response to a receiving timing of a second command from the memory controller.

20. The semiconductor memory device of claim 19, wherein the ECC engine is configured to write the write data associated with the first command to the data region at a first time, and wherein the control logic circuit is further configured to write the first parity data to the parity region at a second time in response to the second command being received prior to an expiration of a reference time interval.

* * * * *